(12) United States Patent
Watanabe et al.

(10) Patent No.: US 10,697,988 B2
(45) Date of Patent: Jun. 30, 2020

(54) CONTAINER MANAGEMENT APPARATUS AND WIRELESS TAG

(71) Applicant: PHC HOLDINGS CORPORATION, Tokyo (JP)

(72) Inventors: Katsuya Watanabe, Nara (JP); Ryoichi Imanaka, Osaka (JP)

(73) Assignee: PHC HOLDINGS CORPORATION, Tokyo (JP)

( * ) Notice: Subject to any disclaimer, the term of this patent is extended or adjusted under 35 U.S.C. 154(b) by 274 days.

(21) Appl. No.: 15/707,702

(22) Filed: Sep. 18, 2017

(65) Prior Publication Data
US 2018/0003730 A1    Jan. 4, 2018

Related U.S. Application Data

(63) Continuation of application No. PCT/JP2016/001839, filed on Mar. 30, 2016.

(30) Foreign Application Priority Data

Mar. 30, 2015 (JP) .................................. 2015-068363
Aug. 18, 2015 (JP) .................................. 2015-161322

(51) Int. Cl.
*G01N 35/02* (2006.01)
*A61J 1/14* (2006.01)
(Continued)

(52) U.S. Cl.
CPC .............. *G01N 35/02* (2013.01); *A61J 1/14* (2013.01); *A61J 3/00* (2013.01);
(Continued)

(58) Field of Classification Search
None
See application file for complete search history.

(56) References Cited

FOREIGN PATENT DOCUMENTS

| JP | H08-043527 A | 2/1996 |
|----|--------------|--------|
| JP | 2005-125144 A | 5/2005 |

(Continued)

OTHER PUBLICATIONS

Machine-generated English translation of JP 2014-190864, published Oct. 6, 2014, 16 pages.*

(Continued)

*Primary Examiner* — Kathryn Wright
(74) *Attorney, Agent, or Firm* — McDermott Will & Emery LLP

(57) ABSTRACT

A container management apparatus is provided with: a container storing unit that can store a plurality of tubular sample containers one by one separately, each of the plurality of tubular sample containers being provided with a two-dimensional bar code on the bottom surface thereof, and container-identifying information being coded in the two-dimensional bar code; and a reading unit that reads the two-dimensional bar code of each of the tubular sample containers stored in the container storing unit and retrieves the container identifying information. The reading unit has, in correspondence with each storing position, an LED that irradiates the two-dimensional bar code with irradiation light and an imaging unit that receives reflection light from the two-dimensional bar code.

15 Claims, 17 Drawing Sheets

(51) Int. Cl.
    *G06K 19/07*      (2006.01)
    *G06K 7/10*       (2006.01)
    *A61J 3/00*       (2006.01)
    *G01N 35/04*      (2006.01)
    *G01N 35/00*      (2006.01)
(52) U.S. Cl.
    CPC ....... *G01N 35/00732* (2013.01); *G01N 35/04* (2013.01); *G06K 7/10* (2013.01); *G06K 19/07* (2013.01); *G01N 2035/0493* (2013.01)

(56) References Cited

FOREIGN PATENT DOCUMENTS

| JP | 2011-185893 A | 9/2011 |
| JP | 2014190864 A * | 10/2014 |

OTHER PUBLICATIONS

International Search Report and Written Opinion issued in International Patent Application No. PCT/JP2016/001839, dated Jun. 21, 2016; with partial English translation.

* cited by examiner

CONTAINER MANAGEMENT APPARATUS AND WIRELESS TAG

RELATED APPLICATIONS

This application is a Continuation Application of International Patent Application No. PCT/JP2016/001839, filed on Mar. 30, 2016, which in turn claims the benefit of Japanese Application No. 2015-068363, filed on Mar. 30, 2015, and Japanese Application No. 2015-161322, filed on Aug. 18, 2015, the entire disclosures of which Applications are incorporated by reference herein.

TECHNICAL FIELD

The present invention relates to a container management apparatus and a wireless tag for managing a container that contains a specimen.

BACKGROUND ART

Specimen processing systems are conventionally known in the fields of regenerative medicine and genetic analysis or the like, which process specimens such as blood and cells. A specimen management method using this type of specimen processing system is implemented using following procedures (1) to (4).

(1) First, a user stores a specimen in a tubular sample container and then inputs information on the specimen (e.g., information on date, contents and person in charge) to the specimen processing system.

(2) Next, the user sticks a seal with a printed bar code in which an identification number corresponding to information on the specimen is coded, to a side face of the tubular sample container in which the specimen is stored.

(3) Next, the user reads the bar code using a bar code reader, inputs the identification number to the specimen processing system and inputs information on the position of a rack on which the tubular sample container is to be placed (hereinafter referred to as "placement position") in association with the identification number. In this way, the placement position of the tubular sample container on the rack is registered.

(4) The user then places the tubular sample container at the placement position and stores the rack in a freezer or incubator.

After (4) above, the user can visually check the position on the rack at which each tubular sample container is located on a monitor on the specimen processing system.

For example, PTL 1 discloses a specimen analysis apparatus that moves a rack holding a container that contains a specimen in a row direction and a column direction and reads information attached to the container using an optical sensor. This makes it possible to prevent erroneous detection of information of a container adjacent to the container whose information is to be read.

CITATION LIST

Patent Literature

PTL 1
Japanese Patent Application Laid-Open No. 2011-185893

SUMMARY OF INVENTION

Technical Problem

However, the aforementioned conventional specimen processing system involves a problem that if the user places the tubular sample container at a position different from the registered placement position, it is impossible to perform appropriate management.

Furthermore, the aforementioned specimen analysis apparatus according to PTL 1 performs movement control so that a relative position of the information of the optical sensor and the container becomes constant. Therefore, when the speed at which the information of the container is read is slow and an error is found in the movement control, an error occurs in the reading of the information of the container.

An object of the present invention is to provide a container management apparatus and a wireless tag capable of appropriately managing the container.

Solution to Problem

A container management apparatus according to an aspect of the present invention includes: a container storage section that is capable of storing a plurality of containers while separating the plurality of containers from each other, each of the plurality of containers being provided with an irradiation target body at a bottom surface of the container, the irradiation target body including container identification information; irradiation sections provided in one to one correspondence with storage positions of the containers in the container storage section to irradiate the irradiation target bodies with irradiation light beams, respectively; an information acquiring section that acquires the container identification information from at least one of the irradiation target bodies irradiated with the irradiation light beams; and a control section that receives the container identification information from the information acquiring section, in which: the control section receives the container identification information when the container is stored at a predetermined storage position, generates position registration information that associates the received container identification information with storage position information indicating the predetermined storage position and stores the position registration information in a predetermined storage section, receives the container identification information when the container is stored in the container storage section again after the container for which the position registration information has been registered is removed from the predetermined storage position, reads the position registration information corresponding to the received container identification information from the storage section, determines whether or not storage position information indicating the storage position at which the container is stored again matches the storage position information included in the position registration information read from the storage section, controls a predetermined display section so as to display that the storage position at which the container is stored again is correct, when two pieces of the storage position information match each other, and controls the display section so as to display that the storage position at which the container is stored again is wrong, when the two pieces of the storage position information do not match each other.

A wireless tag according to an aspect of the present invention includes: a storage section that stores predetermined information; an antenna section that transmits a signal containing the predetermined information; a light-receiving device that receives an irradiation light beam; a power generation section that generates power when the light-receiving device receives the irradiation light beam; and a control section that becomes active upon receiving the power generated from the power generation section and performs control to read the predetermined information from the storage section and transmit a signal containing the read predetermined information from the antenna section.

Advantageous Effects of Invention

According to the present invention, it is possible to provide a container management apparatus and a wireless tag capable of appropriately managing the container.

DESCRIPTION OF EMBODIMENTS

Hereinafter, embodiments of the present invention will be described in detail with reference to the accompanying drawings. Note that the embodiments described hereinafter are examples and the present invention is not limited to the embodiments.

Embodiment 1

Embodiment 1 of the present invention will be described.

Figure 1:
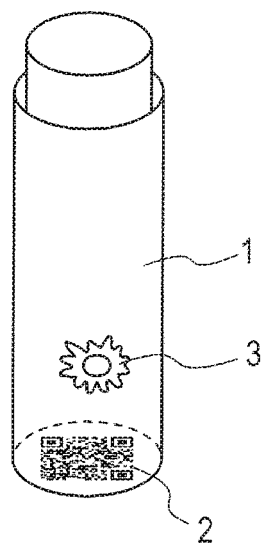
FIG. 1 is a diagram illustrating an example of a tubular sample container according to Embodiments 1 and 2 of the present invention.

First, tubular sample container 1 managed by a container management apparatus of the present embodiment will be described using FIG. 1. FIG. 1 is a diagram illustrating an example of tubular sample container 1.

As shown in FIG. 1, specimen 3 such as a cell or blood is stored in tubular sample container 1. Two-dimensional bar code (also referred to as a "2D bar code") 2 in which container identification information (e.g., identification ID) that can identify tubular sample container 1 is coded is provided on a bottom surface of tubular sample container 1. Two-dimensional bar code 2 is an example of an irradiation target body.

Note that a container that stores specimen 3 is assumed to be a tubular container in the present embodiment, but the container shape is not limited to this. Furthermore, the bar code in which container identification information is coded is assumed to be a two-dimensional bar code in the present embodiment, but the bar code is not limited to the two-dimensional bar code.

Figure 2:
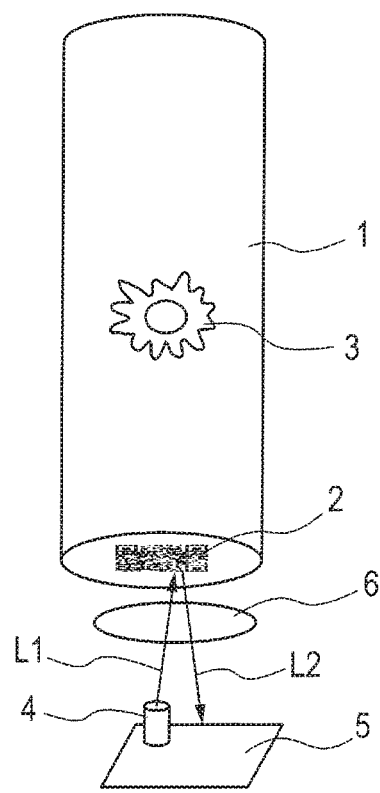
FIG. 2 is a diagram illustrating an example of a configuration for reading a two-dimensional bar code according to Embodiments 1 and 2 of the present invention.

Next, a configuration for reading two-dimensional bar code 2 shown in FIG. 1 will be described using FIG. 2. FIG. 2 is a diagram illustrating an example of a configuration for reading two-dimensional bar code 2.

The container management apparatus of the present embodiment is provided with LED (light emitting diode) 4, imaging unit (also referred to as a "photodetector") 5, and optical element 6 shown in FIG. 2. Imaging unit 5 is formed of, for example, a CCD (charge coupled device) or CMOS (complementary MOS). Optical element 6 is, for example, a lens. LED 4 is an example of an irradiation section, and imaging unit 5 is an example of an information acquiring section or a sensor.

As shown in FIG. 2, LED 4 radiates irradiation light L1 onto two-dimensional bar code 2 and reflected light L2 is received by imaging unit 5. At this time, since irradiation light L1 is spread and reflected light L2 is condensed by optical element 6, it is possible to accurately project the whole shadowing of shading of two-dimensional bar code 2 onto imaging unit 5.

Figure 3A:
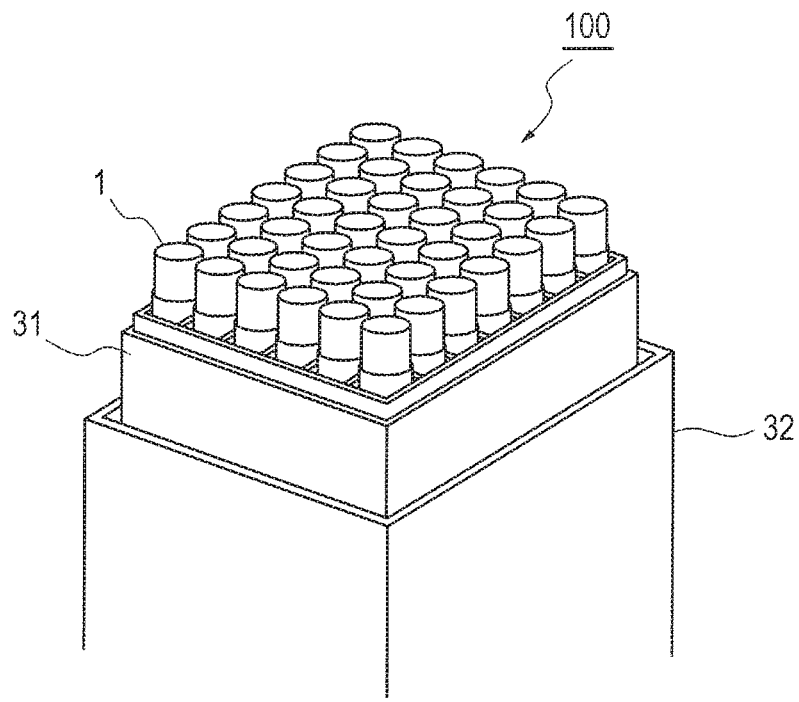
FIG. 3A is a perspective view illustrating an example of appearance of a container management apparatus according to Embodiments 1 and 2 of the present invention.
Figure 3B:
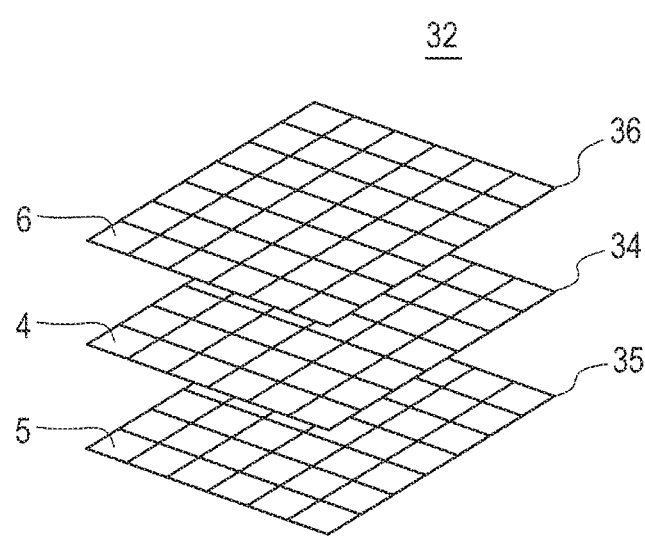
FIG. 3B is a perspective view illustrating an example of a configuration of a reading section of the container management apparatus according to Embodiment 1 of the present invention.
Figure 4:
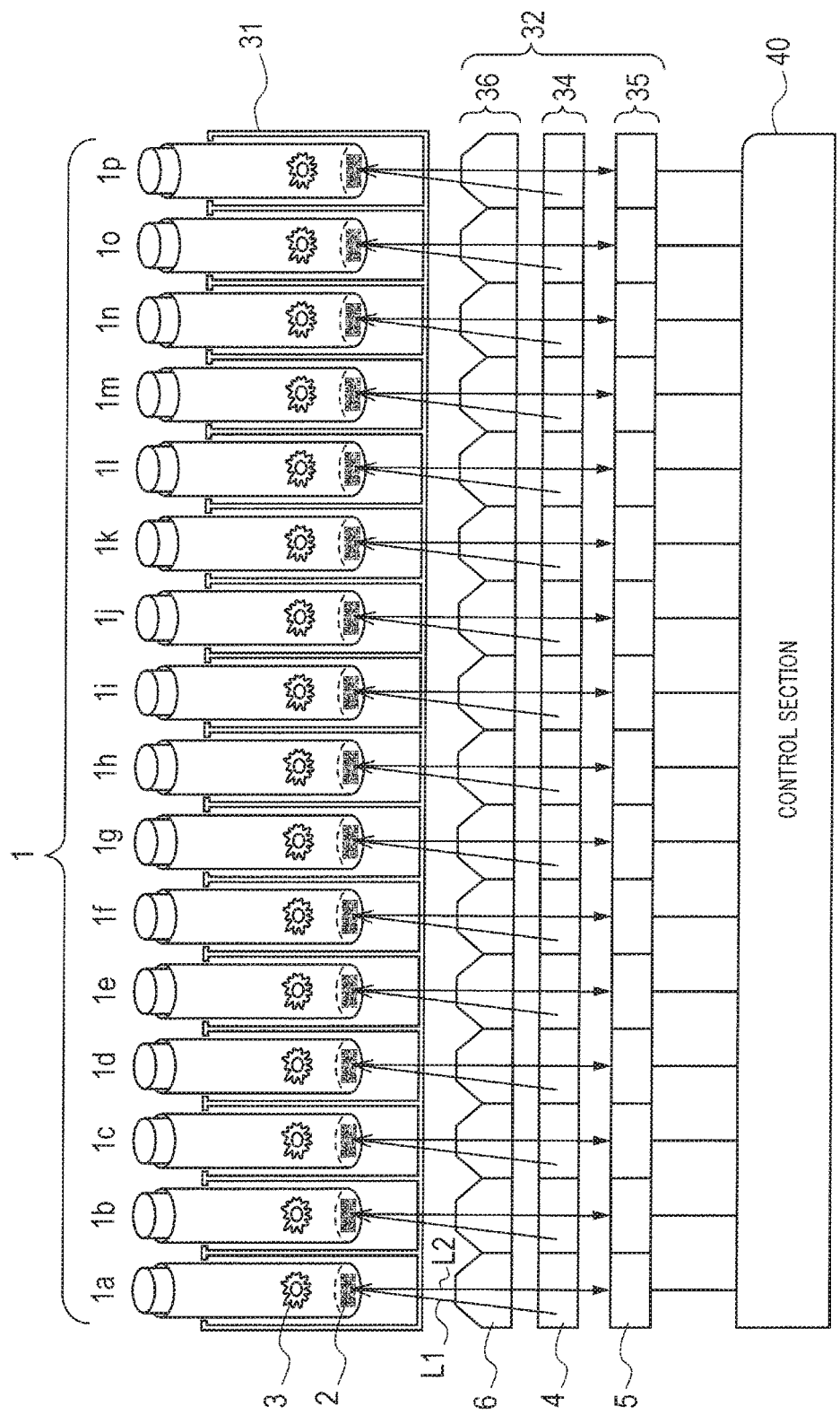
FIG. 4 is a cross-sectional view illustrating an example of a container storage section and a reading section of the container management apparatus according to Embodiment 1 of the present invention.

Next, the configuration of container management apparatus 100 according to the present embodiment will be described using FIG. 3 and FIG. 4. FIG. 3A is a perspective view illustrating an example of appearance of container management apparatus 100 of the present embodiment. FIG. 3B is a perspective view illustrating an example of the configuration of reading section 32 shown in FIG. 3A. FIG. 4 is a cross-sectional view illustrating an example of the configuration of container storage section 31 and reading section 32 shown in FIG. 3A.

As shown in FIG. 3A, container management apparatus 100 of the present embodiment is provided with container storage section (also referred to as a "rack") 31 in which a plurality of tubular sample containers 1 are stored while being separated from each other one by one, and reading section 32 provided below container storage section 31 to read two-dimensional bar code 2 attached to the plurality of tubular sample containers 1. Container storage section 31 is detachably attached to reading section 32.

As shown in FIG. 3B, reading section 32 is provided with LED array 34, imaging unit array 35 and optical element array 36. Optical element array 36 is disposed above LED array 34 and imaging unit array 35 is disposed below LED array 34.

As shown in FIG. 3B, LED array 34 is provided with an array of LEDs 4 shown in FIG. 2. Imaging unit array 35 is provided with an array of imaging units 5 shown in FIG. 2. Optical element array 36 is provided with an array of optical elements 6 shown in FIG. 2.

As shown in FIG. 4, container storage section 31 stores tubular sample containers 1a to 1p in the respective storage sections. Though not shown, the storage section is a space for storing tubular sample container 1. Tubular sample container 1 is inserted into or extracted from this space.

As shown in FIG. 4, the plurality of LEDs 4 constituting LED array 34 are respectively arranged in one-to-one correspondence with the storage sections of tubular sample containers 1a to 1p. That is, respective LEDs 4 disposed in a matrix form as shown in FIG. 4 have a one-to-one correspondence with two-dimensional bar code 2 of tubular sample container 1 stored in the respective storage sections.

Furthermore, as shown in FIG. 4, the plurality of imaging units 5 constituting imaging unit array 35 are respectively arranged in one-to-one correspondence with the storage sections of tubular sample containers 1a to 1p. That is, respective imaging units 5 disposed in a matrix form as shown in FIG. 4 have a one-to-one correspondence with two-dimensional bar code 2 of tubular sample container 1 stored in the respective storage sections.

Furthermore, as shown in FIG. 4, the plurality of optical elements 6 constituting optical element array 36 are respectively arranged in one-to-one correspondence with the storage sections of tubular sample containers 1a to 1p. That is, respective optical elements 6 disposed in a matrix form as shown in FIG. 4 have a one-to-one correspondence with two-dimensional bar code 2 of tubular sample container 1.

Thus, reading section 32 forms a plurality of minimum unit reading sections, the minimum unit being made up of a set of one LED 4, one imaging unit 5 and one optical element 6, and each minimum unit reading section is disposed in one-to-one correspondence with the storage section of one tubular sample container 1.

As described using FIG. 2, irradiation light L1 from each LED 4 is radiated onto each two-dimensional bar code 2 of tubular sample container 1 via each optical element 6 and each reflected light L2 is received by each imaging unit 5 via each optical element 6. That is, in a state in which each tubular sample container 1 is stored in container storage section 31, two-dimensional bar code 2 attached to each tubular sample container 1 is read.

Note that in FIG. 4, each storage section of container storage section 31 is shielded from each other and reflected light L2 is condensed by optical element 6, and so each irradiation light L1 and each reflected light L2 never affect each other.

For example, irradiation light L1 radiated onto two-dimensional bar code 2 of tubular sample container 1a is never radiated onto two-dimensional bar code 2 of tubular sample container 1b. Furthermore, for example, reflected light L2 from two-dimensional bar code 2 of tubular sample container 1a is never received by imaging unit 5 corresponding to tubular sample container 1b.

As shown in FIG. 4, container management apparatus 100 is provided with control section 40. Control section 40 can control turning on/off of irradiation light L1 and increase and/or decrease of irradiation power of irradiation light L1 for respective LEDs 4 constituting LED array 34. As shown in FIG. 4, control section 40 receives a signal from imaging unit 5 constituting imaging unit array 35. Details of the signal will be described later.

Figure 5:
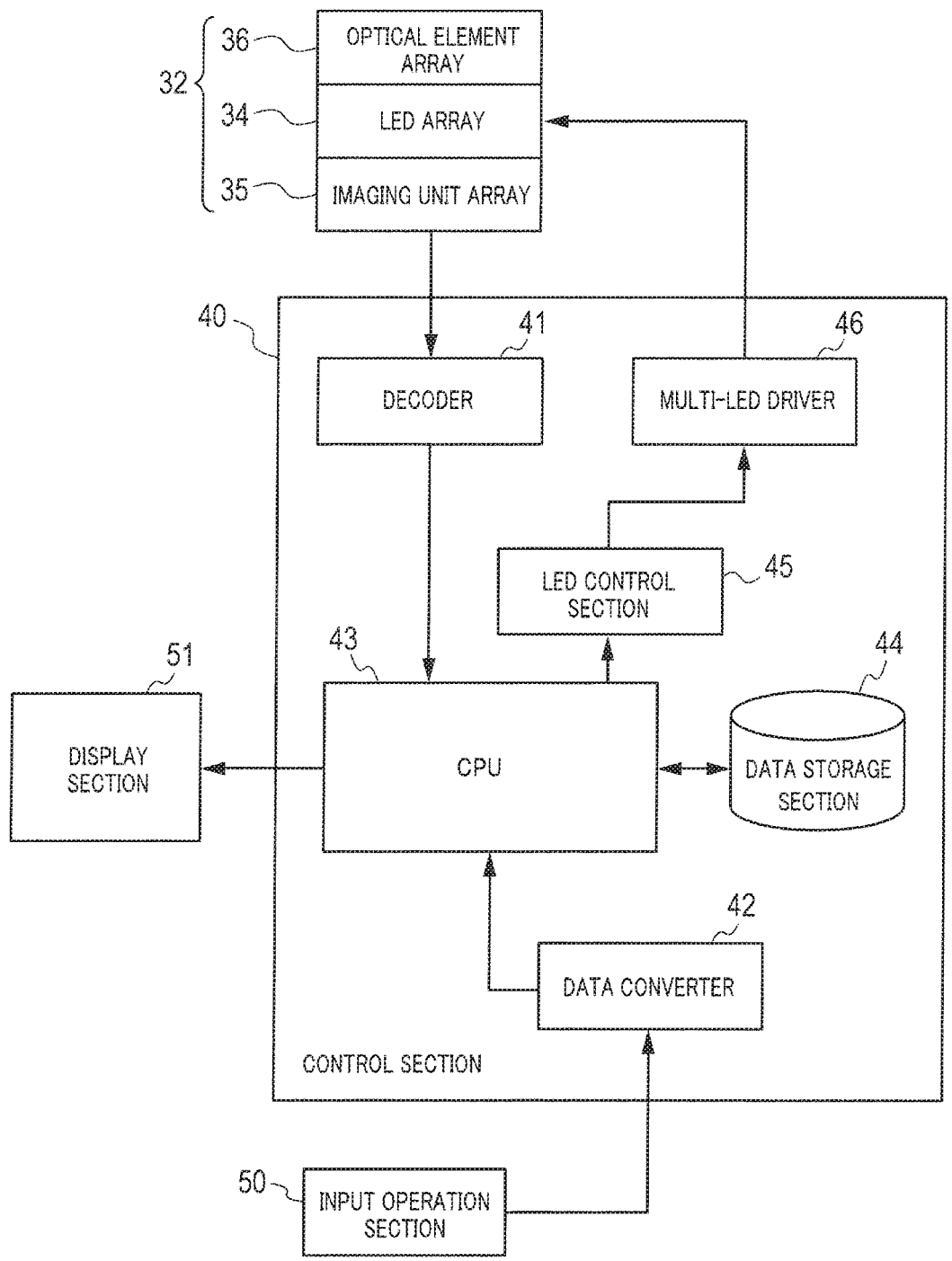
FIG. 5 is a block diagram illustrating an example of a configuration of the container management apparatus according to Embodiment 1 of the present invention.

Next, a configuration of container management apparatus 100 will be described using FIG. 5. FIG. 5 is a block diagram illustrating an example of a configuration of container management apparatus 100. Note that in FIG. 5, illustration of container storage section 31 is omitted.

As shown in FIG. 5, container management apparatus 100 includes reading section 32, control section 40, input operation section 50 and display section 51.

Since reading section 32 has been described using FIG. 3B and FIG. 4, description here is omitted.

Input operation section 50 is an input apparatus such as a touch panel, keyboard or mouse. Input operation section 50 receives an instruction operation, selection operation or the like from the user and outputs information indicating contents of the received operation to control section 40 (details will be described later).

Display section 51 is a display apparatus such as a display. Display section 51 displays information (details will be described later) under the control of control section 40.

Note that container management apparatus 100 may be provided with at least one of input operation section 50 and display section 51 or need not be provided with either input operation section 50 or display section 51.

Control section 40 is provided with decoder (modulator/demodulator) 41, data converter 42, CPU (central processing unit) 43, data storage section 44, LED control section 45 and multi-LED driver 46. Control section 40 is connected to reading section 32, input operation section 50 and display section 51.

Decoder 41 receives a signal from imaging unit 5 constituting imaging unit array 35, decodes the inputted signal and outputs the information obtained through decoding to CPU 43.

For example, decoder 41 receives a signal of container identification information from imaging unit 5 and outputs the container identification information obtained by decoding the signal to CPU 43. The container identification information is information that can identify tubular sample container 1 obtained by imaging unit 5 by reading two-dimensional bar code 2.

Furthermore, decoder 41 receives a signal from a scanning control section (not shown) that scans imaging unit 5 constituting imaging unit array 35, decodes the inputted signal and outputs the information obtained through decoding to CPU 43.

For example, decoder 41 receives a signal of storage position information from the scanning control section and outputs the storage position information obtained by decoding the signal to CPU 43.

The storage position information is information indicating the position of the storage section (or placement position of imaging unit 5) of tubular sample container 1 in container storage section 31. The position of each storage section in container storage section 31 (hereinafter also referred to as "storage position") is known to the scanning control section.

The aforementioned container identification information and the storage position information will be used for a container position registration process which will be described later and a container position determination process which will be described later.

Data converter 42 receives information received by input operation section 50 (hereinafter referred to as "input information"), converts the input information to a predetermined data format and outputs the input information to CPU 43. The input information is, for example, specimen information.

The specimen information is information relating to specimen 3 stored in tubular sample container 1 (e.g., information indicating a date on which specimen 3 is stored, contents of specimen 3). The specimen information is used for a container position registration process which will be described later.

When tubular sample container 1 is stored in container storage section 31 for the first time, CPU 43 receives container identification information and storage position information from decoder 41, and performs a container position registration process based on the container identification information and the storage position information, and the specimen information inputted from data converter 42.

The container position registration process is a process of registering the position of container storage section 31 in which tubular sample container 1 is stored. For example, CPU 43 generates position registration information that associates the container identification information and the storage position information with the specimen information and causes data storage section 44 to store the position registration information.

During the container position registration process, CPU 43 controls display section 51 so as to display the container identification information and the storage position information in order for the user to visually check the association between the container identification information and the storage position information.

Alternatively, during the above-described container position registration process, CPU 43 may also control display section 51 so as to display the container identification information, the storage position information and the specimen information in order for the user to visually check the association between the container identification information and the storage position information with the specimen information.

When tubular sample container 1 is extracted from container storage section 31, CPU 43 receives the container identification information and the storage position information from decoder 41 and reads the position registration information corresponding to the container identification information and the storage position information from data storage section 44.

CPU 43 adds extraction information indicating that tubular sample container 1 has been extracted to the read position registration information and updates the position registration information. The position registration information to which the extraction information is added is used for a container position determination process which will be described later.

When tubular sample container 1 is extracted from container storage section 31, and then stored in container storage section 31 again, CPU 43 receives the container identification information and the storage position information from decoder 41 and performs a container position determination process based on the container identification information and the storage position information, and the position registration information stored in data storage section 44.

The container position determination process is a process of determining whether or not tubular sample container 1 is stored at a position of container storage section 31 registered in advance (hereinafter referred to as "registered position"). Here, a specific example of the container position determination process will be described below.

For example, CPU 43 first reads from data storage section 44, the position registration information to which extraction information is added corresponding to the container identification information received from decoder 41. CPU 43 then determines whether or not the storage position information received from decoder 41 matches the storage position information included in the read position registration information.

When the above-described determination result shows that the two pieces of storage position information match, CPU 43 determines that tubular sample container 1 is stored at the registered position. In this case, CPU 43 controls display section 51 so as to display information indicating that tubular sample container 1 is stored at a registered position. This allows the user to recognize that tubular sample container 1 is stored at an appropriate position. CPU 43 then deletes the extraction information from the read position registration information and updates the position registration information.

On the other hand, when the above-described determination result shows that the two pieces of storage position information do not match, CPU 43 determines that tubular sample container 1 is not stored at the registered position. In this case, CPU 43 controls display section 51 so as to display information indicating that tubular sample container 1 is not stored at the registered position. This allows the user to recognize that tubular sample container 1 is stored at a wrong position.

A specific example of the container position determination process has been described so far. Hereinafter, FIG. 5 will be described again.

When CPU 43 cannot read the container identification information from decoder 41, CPU 43 instructs LED control section 45 to increase irradiation power of irradiation light L1 of LED 4. After that, when CPU 43 can read the container identification information, CPU 43 instructs LED control section 45 to decrease irradiation power of irradiation light L1 of LED 4 (so as to restore the original irradiation power).

Furthermore, CPU 43 may also control entire container management apparatus 100.

Data storage section 44 is a storage device such as a memory or hard disk apparatus. As described above, data storage section 44 stores the position registration information.

Note that although the example in FIG. 5 shows a configuration in which control section 40 is provided with data storage section 44, data storage section 44 may also be provided outside control section 40. In that case, data storage section 44 may be incorporated in container management apparatus 100 or may be provided outside container management apparatus 100.

When power of container management apparatus 100 or control section 40 is turned on, LED control section 45 controls multi-LED driver 46 so as turn on each LED 4 of LED array 34. Furthermore, when power of container management apparatus 100 or control section 40 is turned off, LED control section 45 controls multi-LED driver 46 so as turn off each LED 4 of LED array 34.

LED control section 45 controls multi-LED driver 46 based on an instruction from CPU 43. For example, upon receiving an instruction for increasing irradiation power of irradiation light L1 from CPU 43, LED control section 45 controls multi-LED driver 46 so that irradiation power is increased by a predetermined value for a certain time period. On the other hand, upon receiving an instruction for decreasing irradiation power of irradiation light L1 from CPU 43, LED control section 45 controls multi-LED driver 46 so that irradiation power is decreased by a predetermined value.

Multi-LED driver 46 drives each LED 4 of LED array 34 based on the control of LED control section 45.

Figure 6:
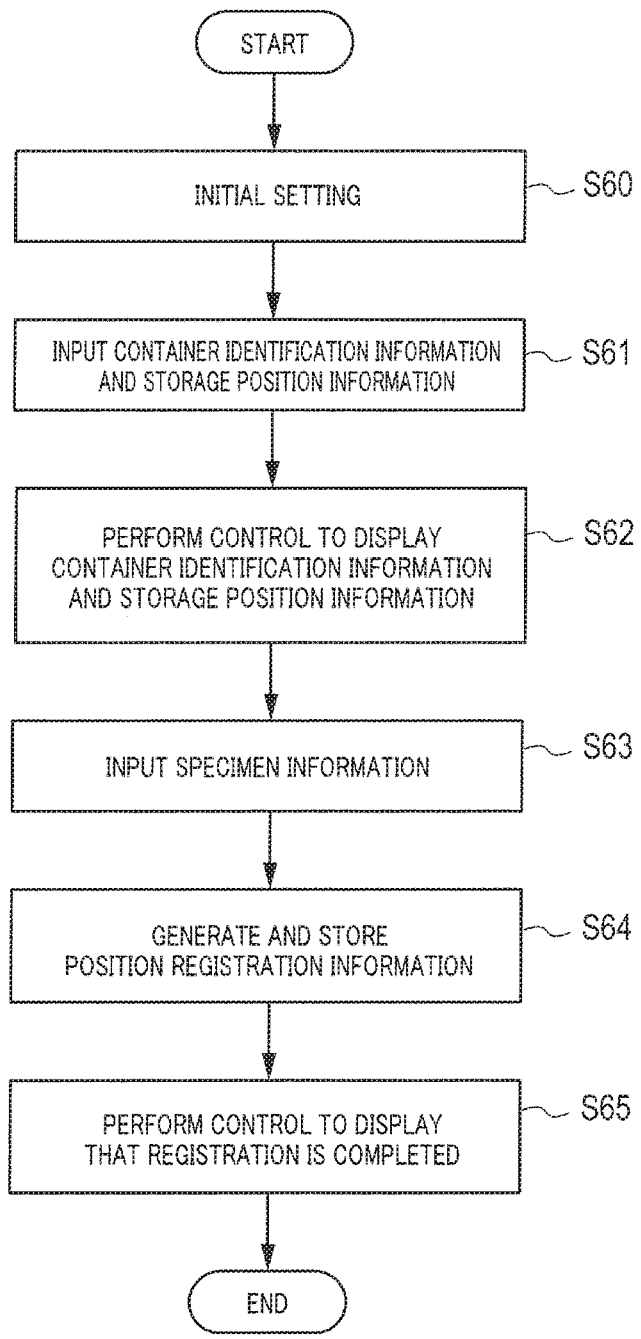
FIG. 6 is a diagram illustrating an example of a container position registration process flow of the container management apparatus according to Embodiment 1 of the present invention.
Figure 7:
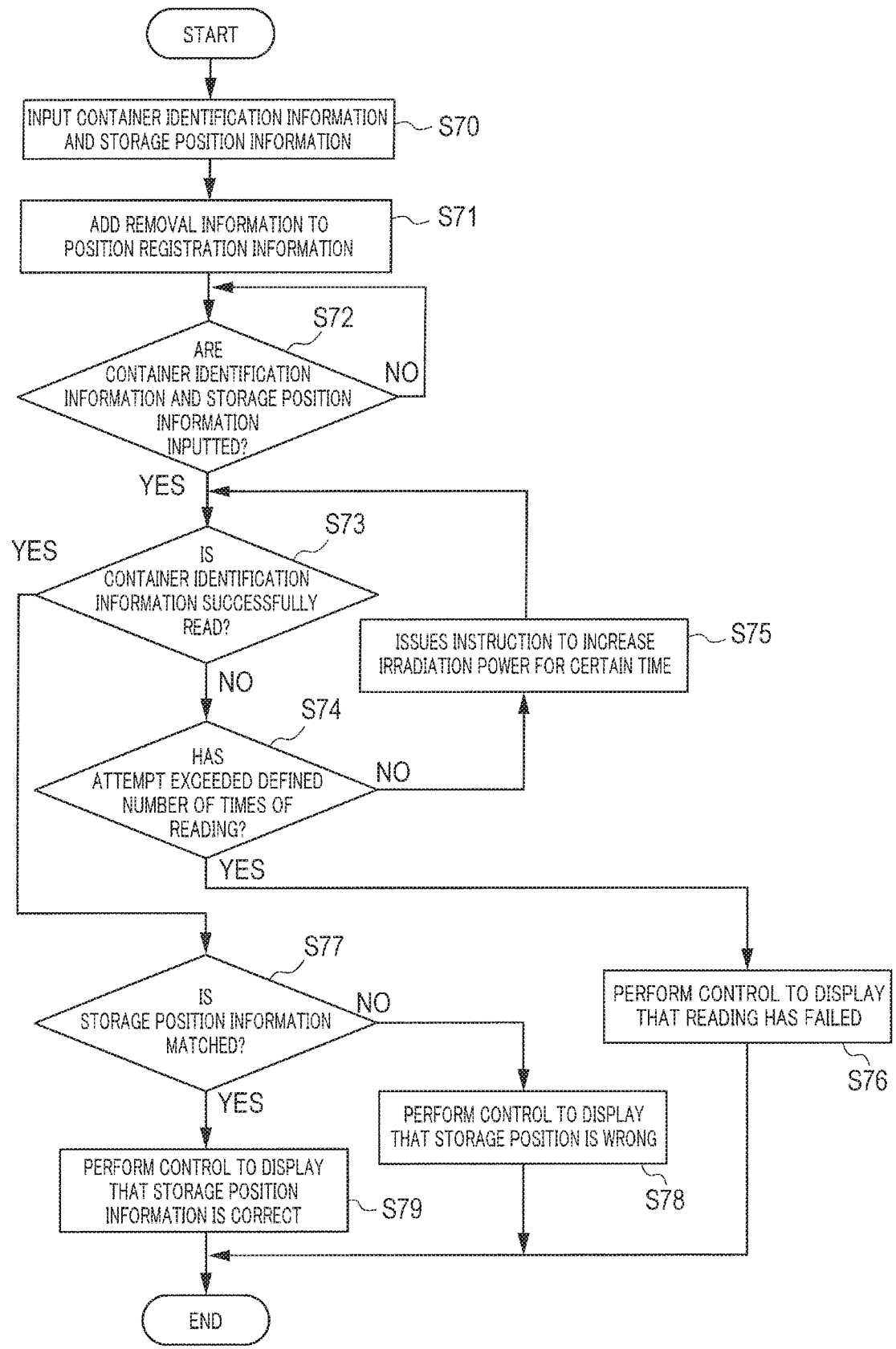
FIG. 7 is a diagram illustrating an example of a container position determination process flow of the container management apparatus according to Embodiment 1 of the present invention.

Next, operation of container management apparatus 100 will be described using FIG. 6 and FIG. 7. FIG. 6 is a diagram illustrating an example of a container position registration process flow. FIG. 7 is a diagram illustrating an example of a container position determination process flow.

First, the container position registration process flow shown in FIG. 6 will be described. This process is performed when, for example, the user stores tubular sample container 1 containing specimen 3 at a predetermined position of container storage section 31 for the first time.

First, when the user turns on the power of container management apparatus 100 and instructs input operation section 50 to make an initial setting, input operation section 50 outputs information indicating the instruction for an initial setting to CPU 43 via data converter 42.

Upon receiving the information indicating the instruction for the initial setting, CPU 43 performs the initial setting (step S60). For example, CPU 43 instructs LED control section 45 to turn on each LED 4 of LED array 34. In response to this instruction, LED control section 45 controls multi-LED driver 46 and multi-LED driver 46 causes each LED 4 to turn on. As a result, irradiation light L1 is radiated from each LED 4 with predetermined irradiation power.

When the user stores tubular sample container 1 at a desired position of container storage section 31, two-dimensional bar code 2 on the bottom surface of tubular sample container 1 is irradiated with irradiation light L1 and reflected light L2 is received by imaging unit 5. Imaging unit 5 outputs a signal of the container identification information obtained by reading two-dimensional bar code 2 to decoder 41.

A scanning control section (not shown) outputs a signal of storage position information indicating the position of imaging unit 5 (in other words, a position at which tubular sample container 1 is stored) to decoder 41. Decoder 41 decodes each signal from imaging unit 5 and the scanning control section and outputs the container identification information and the storage position information obtained through decoding to CPU 43.

Upon receiving the container identification information and the storage position information (step S61), CPU 43 controls display section 51 so as to display the container identification information and the storage position information (step S62). Under this control, display section 51 displays the container identification information and the storage position information. Thus, the user can confirm the container identification information and the storage position information regarding stored tubular sample container 1.

When the user performs input operation of specimen information using input operation section 50, input operation section 50 outputs the specimen information to CPU 43 via data converter 42.

Upon receiving the specimen information (step S63), CPU 43 generates position registration information which associates the container identification information and the storage position information with the specimen information and causes data storage section 44 to store the position registration information (step S64).

CPU 43 controls display section 51 so as to display that registration of the storage position is completed (step S65). Under this control, display section 51 displays a message or the like indicating that the registration of the storage position is completed. Thus, the user can recognize that the registration of the storage position is completed.

After that, the user turns off the power of container management apparatus 100. This causes each LED 4 to turn off. The user removes container storage section 31 in which tubular sample container 1 is stored from reading section 32 and stores container storage section 31, for example, in a freezer or incubator. Thus, tubular sample container 1 is stored in a state in which it is stored in container storage section 31.

The container position registration process flow shown in FIG. 6 has been described so far.

Next, the container position determination process flow shown in FIG. 7 will be described. This process is performed when, for example, the user extracts tubular sample container 1 from container storage section 31 for observation and stores tubular sample container 1 in container storage section 31 again after observation.

First, the user extracts container storage section 31 from the freezer or incubator and attaches container storage section 31 to reading section 32. The user turns on the power of container management apparatus 100. This causes each LED 4 to turn on and imaging unit 5 starts reading two-dimensional bar code 2.

When the user extracts tubular sample container 1 from container storage section 31 here, imaging unit 5 no longer receives reflected light L2. In this case, before reflected light L2 is no longer received, imaging unit 5 outputs the signal of the container identification information read from two-dimensional bar code 2 to decoder 41.

The scanning control section outputs the signal of the storage position information indicating the predetermined position of imaging unit 5 (in other words, the position at which tubular sample container 1 is stored) to decoder 41. Decoder 41 decodes each signal from imaging unit 5 and the scanning control section and outputs the container identification information and the storage position information obtained through decoding to CPU 43.

Upon receiving the container identification information and the storage position information (step S70), CPU 43 reads position registration information corresponding to the container identification information from data storage section 44.

CPU 43 adds extraction information indicating that tubular sample container 1 has been extracted to the read position registration information and updates the position registration information (step S71).

Note that after step S70 or step S71, CPU 43 may control display section 51 so as to display the container identification information and the storage position information. Under this control, display section 51 displays the container identification information and the storage position information. This allows the user to confirm the container identification information and the storage position information regarding extracted tubular sample container 1.

After that, CPU 43 waits until the container identification information and the storage position information are received again (step S72: NO). When the user who has completed the observation of extracted tubular sample container 1 stores tubular sample container 1 in container storage section 31 again, CPU 43 receives the container identification information and the storage position information from decoder 41 (step S72: YES).

Next, CPU 43 determines whether or not the container identification information has been successfully read (step S73). When two-dimensional bar code 2 has been successfully read by imaging unit 5, CPU 43 can read the container identification information. On the other hand, when imaging unit 5 has failed to read two-dimensional bar code 2, CPU 43 cannot read the container identification information When the result of the determination process in step S73 shows that the container identification information has been successfully read (step S73: YES), CPU 43 performs a determination process in step S77. The determination process in step S77 will be described later.

When the result of the determination process in step S73 shows that the container identification information has not been successfully read (step S73: NO), CPU 43 determines whether or not the number of times of reading has exceeded a defined number of times of reading (e.g., three times) (step S74).

When the result of the determination process in step S74 shows that the number of times of reading has exceeded the defined number of times of reading (step S74: YES), CPU 43 performs a process in step S76. The determination process in step S76 will be described later.

When the result of the determination process in step S74 shows that the number of times of reading has not exceeded a defined number of times of reading (step S74: NO), CPU 43 instructs LED control section 45 to increase irradiation power of irradiation light L1 of LED 4 (step S75).

Upon receiving this instruction, LED control section 45 controls multi-LED driver 46 so as to increase the irradiation power by a predetermined value for a certain time period. This causes the irradiation power of irradiation light from LED 4 corresponding to the position indicated by the storage position information to increase. Note that the increment in the irradiation power is set within a range in which specimen 3 is not affected.

By increasing the irradiation light in this way, it is possible to evaporate the water content (e.g., fog or water vapor) adhered to the portion of tubular sample container 1 to which two-dimensional bar code 2 is attached and read two-dimensional bar code 2.

For example, when container storage section 31 is extracted from the freezer or the like for observation, a water content may be adhered to tubular sample container 1 stored in container storage section 31 to thereby prevent two-dimensional bar code 2 from being read, but under the above-described control whereby the irradiation power is increased, two-dimensional bar code 2 can be read by removing the water content, which provides a large effect.

After step S75, determination processes in step S73 and S74 are performed again. That is, the processes in step S73 to S75 are repeated until the container identification information can be read or until a defined number of times of reading is reached.

Note that the water content cannot completely be removed by a single increase of the irradiation power, and it is predictable that reading may fail again, and so it is preferable to set the defined number of times of reading to a plurality of times so that the process in step S75 may be performed over a plurality of times. However, the number of times of reading is assumed to be set within a range in which specimen 3 is not affected.

When the result of the determination process in step S74 shows that the defined number of times of reading has been reached (step S74: YES), CPU 43 controls display section 51 so as to display that reading of the container identification information has failed (step S76).

Under this control, display section 51 displays a message or the like indicating that the reading of the container identification information has failed. This allows the user to recognize that the reading of the container identification information has failed. In this case, the user checks a surface state of tubular sample container 1 and takes action such as manually wiping off the fogging on the bottom surface.

When the result of the determination process in step S73 shows that the container identification information has been successfully read (step S73: YES), CPU 43 reads the position registration information to which extraction information corresponding to the inputted container identification information is added from data storage section 44.

CPU 43 then determines whether or not the storage position information that has been successfully read matches the storage position information included in the position registration information read from data storage section 44 (step S77).

When the result of the determination process in step S77 shows that the two pieces of storage position information do not match (step S77: NO), CPU 43 determines that tubular sample container 1 is not stored at a registered position.

CPU 43 then controls display section 51 so as to display that the storage position of tubular sample container 1 is wrong (step S78). Under this control, display section 51 displays a message or the like indicating that the storage position of tubular sample container 1 is wrong. This allows the user to recognize that tubular sample container 1 is stored at a wrong position.

Note that in step S78, CPU 43 may also control display section 51 so as to display storage position information included in the position registration information. In step S78, CPU 43 may also control LED 4 corresponding to the registered position (position indicated by the storage position information included in the position registration information) to blink. Such control allows the user to recognize a correct position at which tubular sample container 1 should be stored.

When the result of the determination process in step S77 shows that two pieces of storage position information match (step S77: YES), CPU 43 determines that tubular sample container 1 is stored at the registered position.

CPU 43 controls display section 51 so as to display that the storage position of tubular sample container 1 is correct (step S79). Under this control, display section 51 displays a message or the like indicating that the storage position of tubular sample container 1 is correct. This allows the user to recognize that tubular sample container 1 is stored at the correct position.

After that, CPU 43 deletes extraction information from the read position registration information and updates the position registration information.

The container position determination process flow shown in FIG. 7 has been described so far.

As described above, the container management apparatus of the present embodiment determines whether or not storage position information when the container is stored at a predetermined storage position matches storage position information when the container is extracted from the predetermined storage position and then stored again, controls a predetermined display section, when the two pieces of storage position information match, so as to display that the storage position at which the container is stored again is correct, and controls the display section, when the two pieces of storage position information do not match, so as to display that the storage position at which the container is stored again is wrong. This allows the user to appropriately manage the container through the container storage section.

According to the container management apparatus of the present embodiment, a plurality of reading sections are formed, each reading section being made up of one LED, one imaging unit and one optical element as a set, and each reading section being disposed in one-to-one correspondence with one tubular sample container. This makes it possible to accurately and efficiently read the container identification information added to the tubular sample container.

Furthermore, according to the container management apparatus of the present embodiment, the container identification information of the tubular sample container read by the reading section is registered in association with the storage position information indicating the position at which the tubular sample container is stored. This makes it possible to reduce human errors (meaning that the tubular sample container is stored at a position different from the position at which it is registered) when the tubular sample container is stored in the container storage section.

According to the container management apparatus of the present embodiment, by the user only storing the tubular sample container at a desired position of the container storage section, the container identification information of the tubular sample container is read, and the storage position information is associated with the container identification information and registered. Therefore, the user need not perform an operation for instructing the association between the container identification information and the storage position information.

According to the container management apparatus of the present embodiment, when the container identification information of the tubular sample container has not been successfully read, the irradiation power of the LED is increased over a plurality of divided times so as not to affect the specimen and the water content adhered to the tubular sample container is removed, and so it is possible to save time and trouble required for the user to manually remove the water content, and speedily and accurately read container identification information without affecting the specimen.

Note that the present invention is not limited to Embodiment 1, but various modifications can be made. Hereinafter, modifications of Embodiment 1 will be described.

An example has been described in Embodiment 1 where the user stores only container storage section 31 extracted from reading section 32 in a freezer or the like, but container management apparatus 100 may also store container storage section 31, attached to reading section 32, with its power turned on (with each LED 4 turned on) in the freezer or the like. It is thereby possible to conduct an experiment or the like along with a temperature change in the freezer or the like.

In Embodiment 1, when the user extracts tubular sample container 1, control section 40 may control LED 4 corresponding to the position at which tubular sample container 1 is stored so as to blink.

Alternatively, control section 40 may control LED 4 corresponding to the position at which tubular sample container 1 is stored so as to increase its irradiation power. Furthermore, control section 40 may control LED 4 corresponding to the position at which tubular sample container 1 is stored so as to increase its irradiation power and also to blink.

The above-described control may be performed at a time point at which tubular sample container 1 is extracted or when the storage position of the tubular sample container which is stored again is wrong. This allows the user to easily grasp a correct storage position when extracted tubular sample container 1 is stored again.

Furthermore, in Embodiment 1, when the user extracts a plurality of tubular sample containers 1, control section 40 may cause each LED 4 corresponding to the position at which each tubular sample container 1 is stored to blink and change a time interval at which each LED 4 is caused to blink in order of extraction.

For example, when two tubular sample containers 1 are extracted at a predetermined time interval, control section 40 may control LED 4 corresponding to the position at which first extracted tubular sample container 1 is stored to blink at a first time interval and control LED 4 corresponding to the position at which tubular sample container 1 extracted later is stored to blink at a second time interval, which is longer than the first time interval.

This causes LED 4 corresponding to the position at which first extracted tubular sample container 1 is stored to blink at a shorter time interval than LED 4 corresponding to the position at which tubular sample container 1 extracted later is stored, thus helping the user grasp distinction between storage positions.

Embodiment 2

Embodiment 2 of the present invention will be described. A container management apparatus according to the present embodiment is different from the container management apparatus according to Embodiment 1 in that its reading section is provided with a notification LED array.

Figure 8:
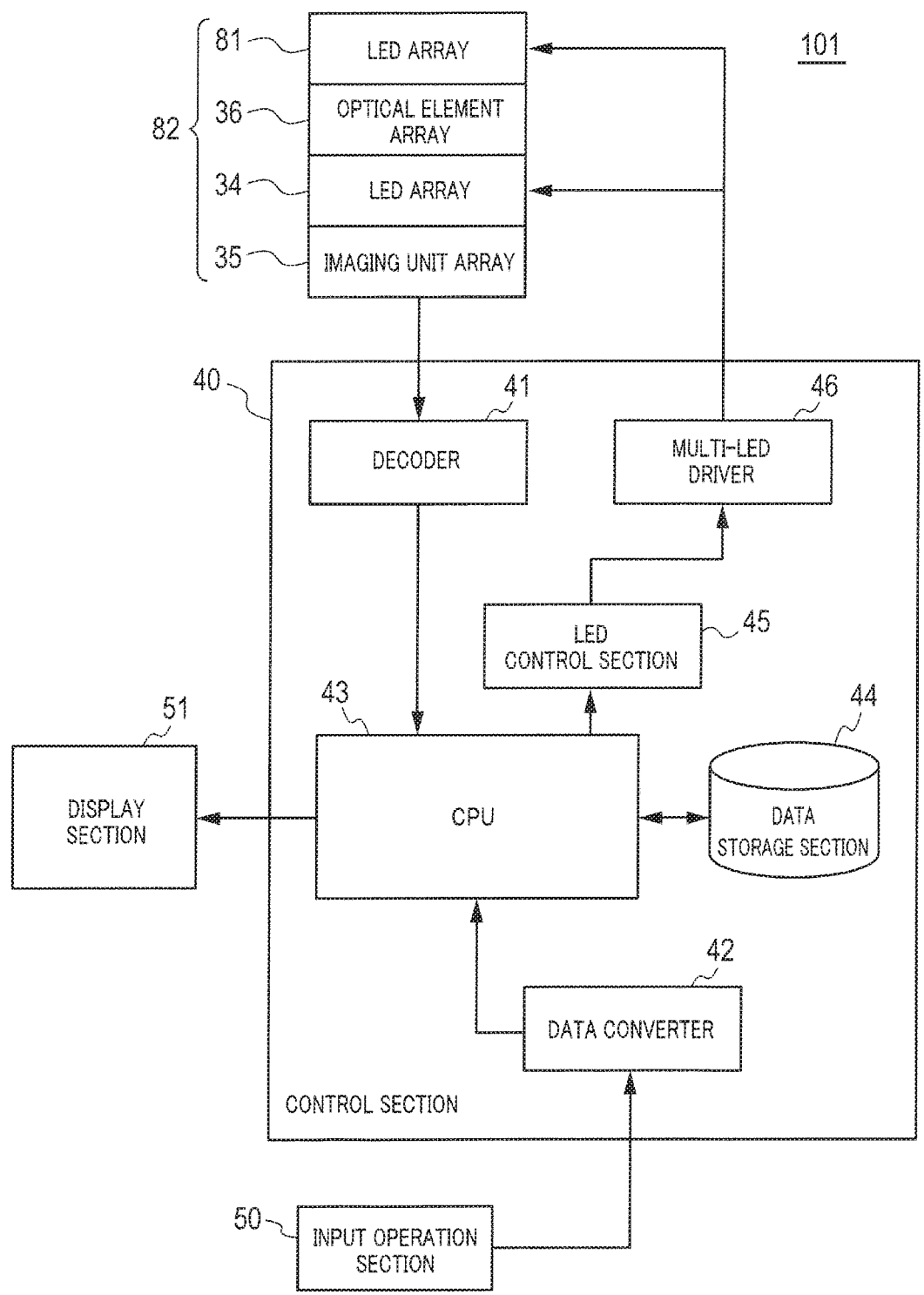
FIG. 8 is a block diagram illustrating an example of a configuration of a container management apparatus according to Embodiment 2 of the present invention.
Figure 9:
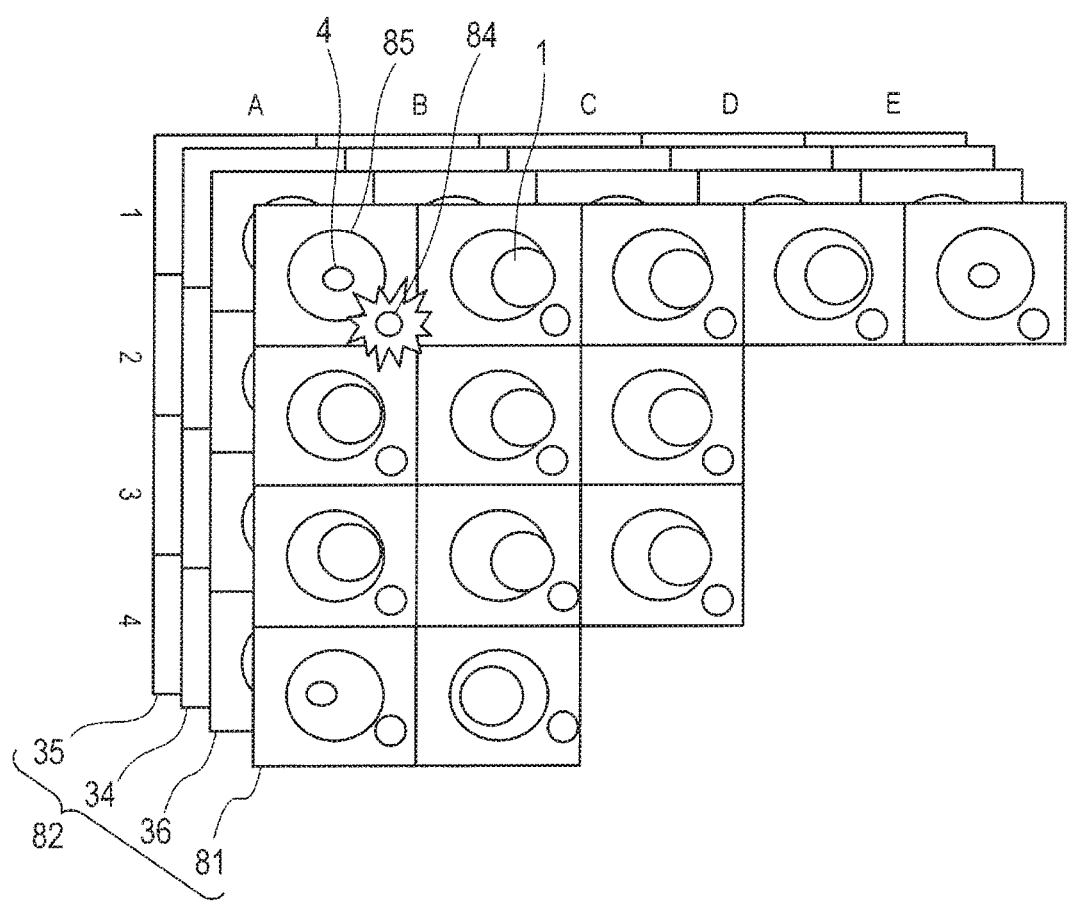
FIG. 9 is a top view illustrating an example of a reading section of the container management apparatus according to Embodiment 2 of the present invention.

First, a configuration of reading section 82 of container management apparatus 101 of the present embodiment will be described using FIG. 8 and FIG. 9. FIG. 8 is a block diagram illustrating an example of a configuration of container management apparatus 101 of the present embodiment. FIG. 9 is a top view illustrating an example of reading section 82 of container management apparatus 101 of the present embodiment. Note that in FIG. 8, the same components as those in FIG. 5 described in Embodiment 1 are assigned the same reference numerals and detailed description is omitted.

As shown in FIG. 8 and FIG. 9, reading section 82 provided for container management apparatus 101 of the present embodiment includes LED array 81 which is different from LED array 34, above optical element array 36.

When tubular sample container 1 is stored again at a wrong position or when reading of two-dimensional bar code 2 of tubular sample container 1 fails, LED array 81 turns on to notify the user of the storage section of tubular sample container 1.

As shown in FIG. 8, CPU 43 and LED control section 45 control LED array 81 apart from LED array 34 via multi-LED driver 46. A control example of LED array 81 will be described later using FIG. 10.

As shown in FIG. 9, LED array 81 is provided with LEDs 84 in an array form. The plurality of LEDs 84 are arranged in one-to-one correspondence with the positions of the storage sections of respective tubular sample containers 1. LED 84 is disposed in the vicinity of insertion port 85 of tubular sample container 1 to be easily visible to the user.

In FIG. 9, as an example, positions in the lateral direction of the storage sections of tubular sample containers 1 are represented by alphabets A to E and positions in the longitudinal direction of the storage sections of tubular sample containers 1 are represented by numbers 1 to 4. The respective storage sections are shielded from each other as described in Embodiment 1. Thus, light of LED 4 located in a predetermined storage section is never affected by light of LED 4 located in a neighboring storage section. Furthermore, light of LED 84 located in a predetermined storage section is never affected by light of LED 84 located in a neighboring storage section.

In FIG. 9, LED 4 and LED 84 which are located in the same storage section, are arranged a predetermined distance apart from each other. Thus, light of LED 4 and light of LED 84 located in the same storage section have no influence on each other.

In consideration of influences on specimen 3, ease to read two-dimensional bar code 2 and effects of removing water content adhered to tubular sample container 1, the wavelength of LED 4 is preferably an infrared region or in the vicinity thereof. Irradiation power of LED 4 is preferably controlled so as to be minimized within a range in which two-dimensional bar code 2 can be read. On the other hand, irradiation power of LED 84 preferably falls within a green or red wavelength region which provides good viewability for the user, but this is not exclusive.

Figure 10:
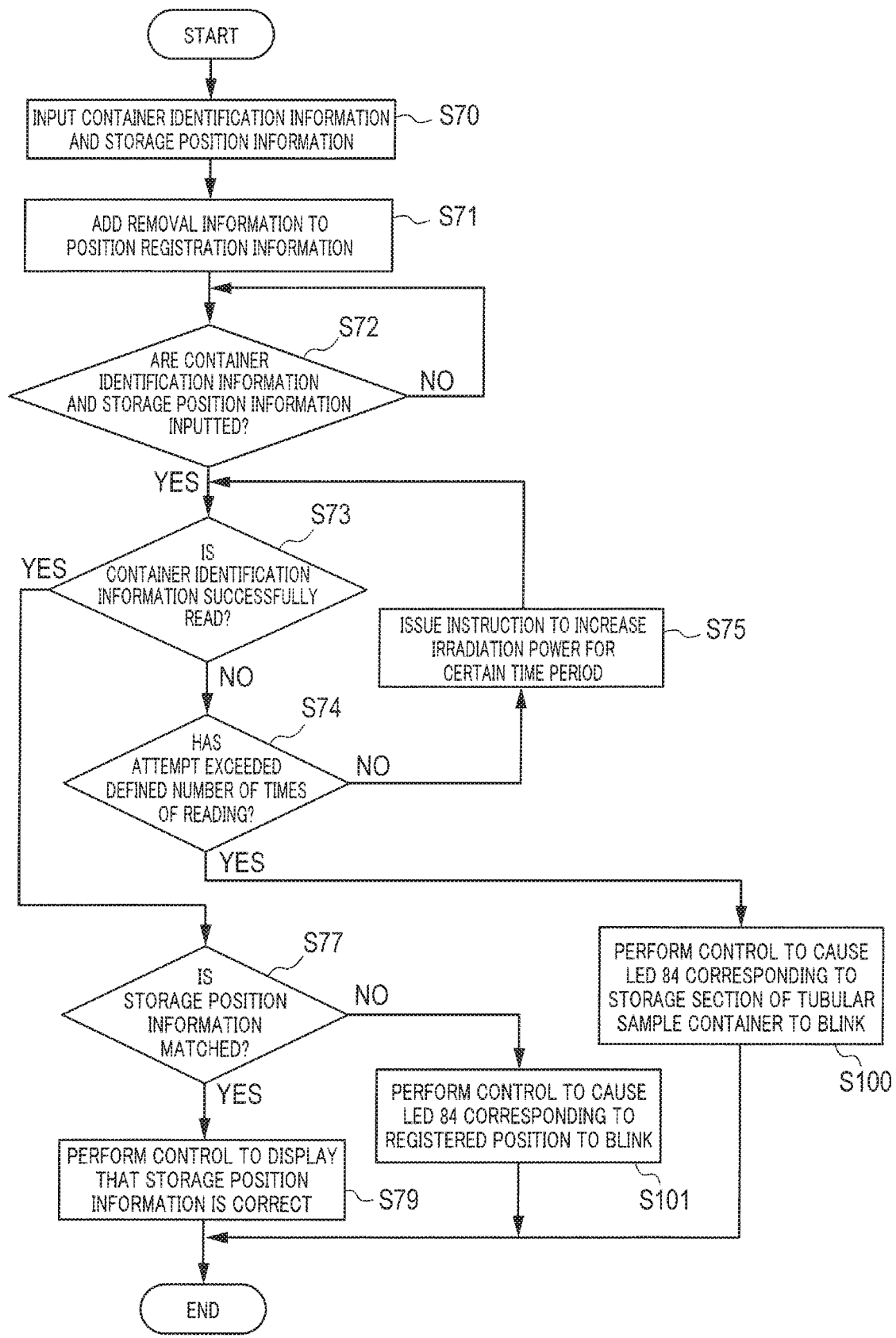
FIG. 10 is a diagram illustrating an example of a container position determination process flow of the container management apparatus according to Embodiment 2 of the present invention.

Next, operation of container management apparatus 101 will be described using FIG. 10. FIG. 10 is a diagram illustrating an example of a container position determination process flow. Since the container position registration process of the present embodiment is the same as that of Embodiment 1, description here is omitted. In FIG. 10, the same steps as those in FIG. 7 described in Embodiment 1 are assigned the same reference numerals, and only step S100 and step S101 which are different from those in FIG. 7 will be described hereinafter.

First, step S100 will be described. When the result of the determination process in step S74 shows that the defined number of times of reading is reached (step S74: YES), CPU 43 controls display section 51 so as to cause LED 84 corresponding to the storage section of tubular sample container 1 stored again to blink (step S100).

For example, when tubular sample container 1 is stored again in storage section A1 as shown in FIG. 9, LED 84 corresponding to storage section A1 blinks. This allows the user to recognize that the reading of the container identification information has failed. In this case, the user checks the surface state of tubular sample container 1 and takes action such as manually wiping off the fogging on the bottom surface.

Note that in step S100, CPU 43 may also control display section 51 so as to display that the reading of the container identification information has failed in addition to the blinking control of LED 84. Under this control, a message or the like indicating that the reading of the container identification information has failed is displayed on display section 51. This allows the user to easily recognize that the reading of the container identification information has failed.

Next, step S101 will be described. When the result of the determination process in step S77 shows that tubular sample container 1 is not stored at the registered position since the two pieces of storage position information do not match (step S77: NO), CPU 43 controls display section 51 so as to cause LED 84 corresponding to the storage section (that is, the registered position) of registered tubular sample container 1 to blink (step S101).

For example, in FIG. 9, when the user stores tubular sample container 1 not in registered storage section A1 but in storage section A4 again, LED 84 corresponding to storage section A1 blinks. This allows the user to recognize that tubular sample container 1 has been stored at a wrong position. In this case, the user extracts tubular sample container 1 from storage section A4 and stores tubular sample container 1 in storage section A1 whose LED 84 is blinking.

Note that in step S101, CPU 43 may also control display section 51 so as to display that the storage position of tubular sample container 1 is wrong in addition to the blinking control of LED 84. Under this control, a message or the like indicating that the storage position of tubular sample container 1 is wrong is displayed on display section 51. This allows the user to more easily recognize that tubular sample container 1 has been stored at a wrong position.

As described above, according to the container management apparatus of the present embodiment, it is possible to achieve effects similar to those of the aforementioned container management apparatus of Embodiment 1 and allow the user to recognize that reading of the container identification information of re-stored tubular sample container 1 has failed or that re-stored tubular sample container 1 has been stored at a wrong position.

Note that the present invention is not limited to Embodiment 2, but various modifications can be made. Hereinafter, modifications of Embodiment 2 will be described.

In Embodiment 2, when the user extracts a plurality of tubular sample containers 1, control section 40 may cause each LED 84 corresponding to the position at which each tubular sample container 1 is stored to blink and change a time interval for causing each LED 84 to blink in accordance with the order in which tubular sample containers 1 are extracted.

For example, when two tubular sample containers 1 are extracted at a predetermined time interval, control section 40 may perform control so as to cause LED 84 corresponding to the position at which first extracted tubular sample container 1 is stored to blink at a first time interval and cause LED 84 corresponding to the position at which next extracted tubular sample container 1 is stored to blink at a second time interval which is longer than the first time interval.

Thus, LED 84 corresponding to the position at which first extracted tubular sample container 1 is stored blinks at a time interval shorter than LED 84 corresponding to the position at which next extracted tubular sample container 1 is stored, and so the user can more easily grasp a distinction between storage positions.

Embodiment 3

Embodiment 3 of the present invention will be described.

Figure 11:
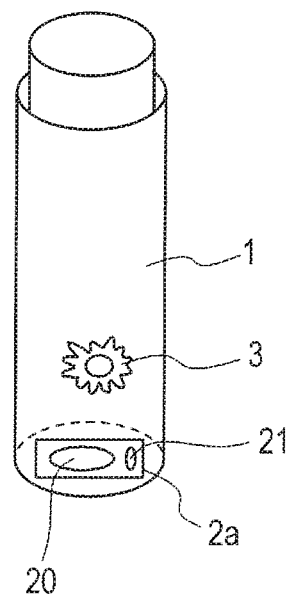
FIG. 11 is a diagram illustrating an example of a tubular sample container according to Embodiment 3 of the present invention.

First, tubular sample container 1 managed by a container management apparatus of the present embodiment will be described using FIG. 11. FIG. 11 is a diagram illustrating an example of tubular sample container 1.

As shown in FIG. 11, tubular sample container 1 stores specimen 3 such as cells or blood. RF (radio frequency) tag 2*a* is provided on a bottom surface of tubular sample container 1. RF tag 2*a* is an example of an irradiation target body.

Note that in the present embodiment, the container in which specimen 3 is stored is assumed to be of a tubular type, but the shape of the container is not limited to this.

Figure 12:
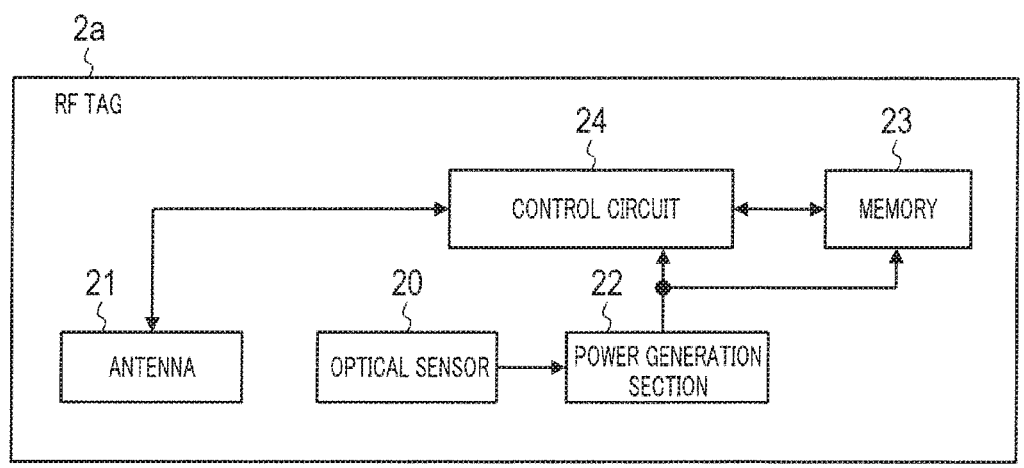
FIG. 12 is a diagram illustrating an example of a configuration of an RF tag according to Embodiment 3 of the present invention.

Next, RF tag 2*a* of the present embodiment will be described using FIG. 12. FIG. 12 is a diagram illustrating an example a configuration of RF tag 2*a*.

RF tag 2*a* is a passive type RFID tag (wireless tag). As shown in FIG. 12, RF tag 2*a* is provided with optical sensor 20 (an example of a light-receiving section), antenna 21, power generation section 22, memory 23 (an example of a storage section), and control circuit 24 (an example of a control section).

Optical sensor 20 is a light-receiving device that receives irradiation light from LED 4 (light emitting diode, see FIG. 13 or the like) which will be described later.

Antenna 21 transmits a signal including container identification information to antenna 5*a* (see FIG. 13 or the like) which will be described later. The container identification information refers to information that can identify tubular sample container 1.

When optical sensor 20 receives irradiation light, power generation section 22 generates power of operate memory 23 and control circuit 24 and supplies the power generated to memory 23 and control circuit 24.

Memory 23 stores preset container identification information. Memory 23 is activated by a power supply from power generation section 22.

When activated by the power supply from power generation section 22, control circuit 24 reads the container identification information from memory 23 and causes antenna 21 to transmit a signal including the container identification information.

Figure 13:
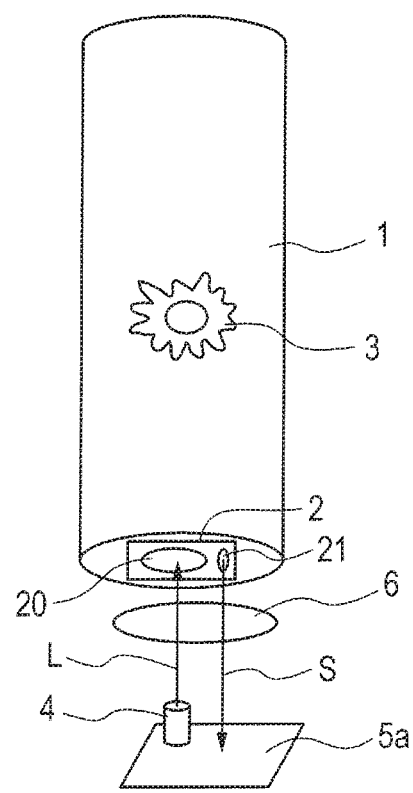
FIG. 13 is a diagram illustrating an example of a configuration for reading the RF tag according to Embodiment 3 of the present invention.

Next, a configuration for reading RF tag 2*a* shown in FIG. 11 and FIG. 12 will be described using FIG. 13. FIG. 13 is a diagram illustrating an example of a configuration for reading RF tag 2*a*.

The container management apparatus of the present embodiment is provided with LED 4, antenna 5*a*, and optical element 6 shown in FIG. 13. Optical element 6 is, for example, a lens. LED 4 is an example of an irradiation section and antenna 5*a* is an example of an information acquisition section.

As shown in FIG. 13, when LED 4 radiates irradiation light L onto RF tag 2*a*, irradiation light L is received by optical sensor 20 of RF tag 2*a*. At this time, since irradiation light L is spread by optical element 6, optical sensor 20 can securely receive irradiation light L.

When optical sensor 20 receives irradiation light L, power generated by power generation section 22 is supplied to memory 23 and control circuit 24, and memory 23 and control circuit 24 are thereby activated. Control circuit 24 reads the container identification information from memory 23 and causes antenna 21 to transmit signal S (hereinafter simply referred to as "signal S") including the container identification information.

Signal S transmitted from antenna 21 is received by antenna 5*a*.

Figure 14A:
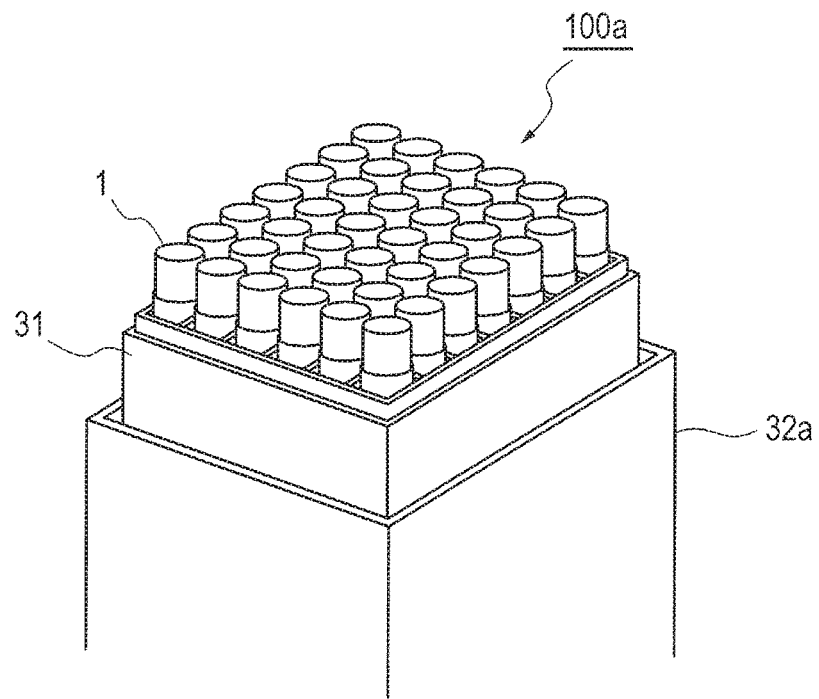
FIG. 14A is a perspective view illustrating an example of appearance of the container management apparatus according to Embodiment 3 of the present invention.
Figure 14B:
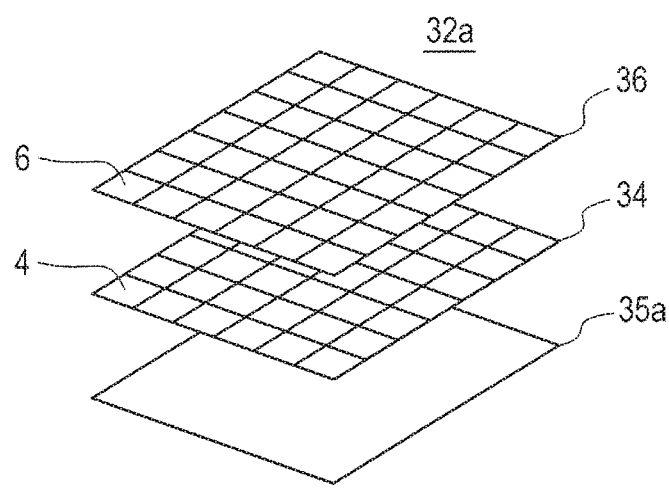
FIG. 14B is a perspective view illustrating an example of a configuration of a reading section of the container management apparatus according to Embodiment 3 of the present invention.
Figure 15:
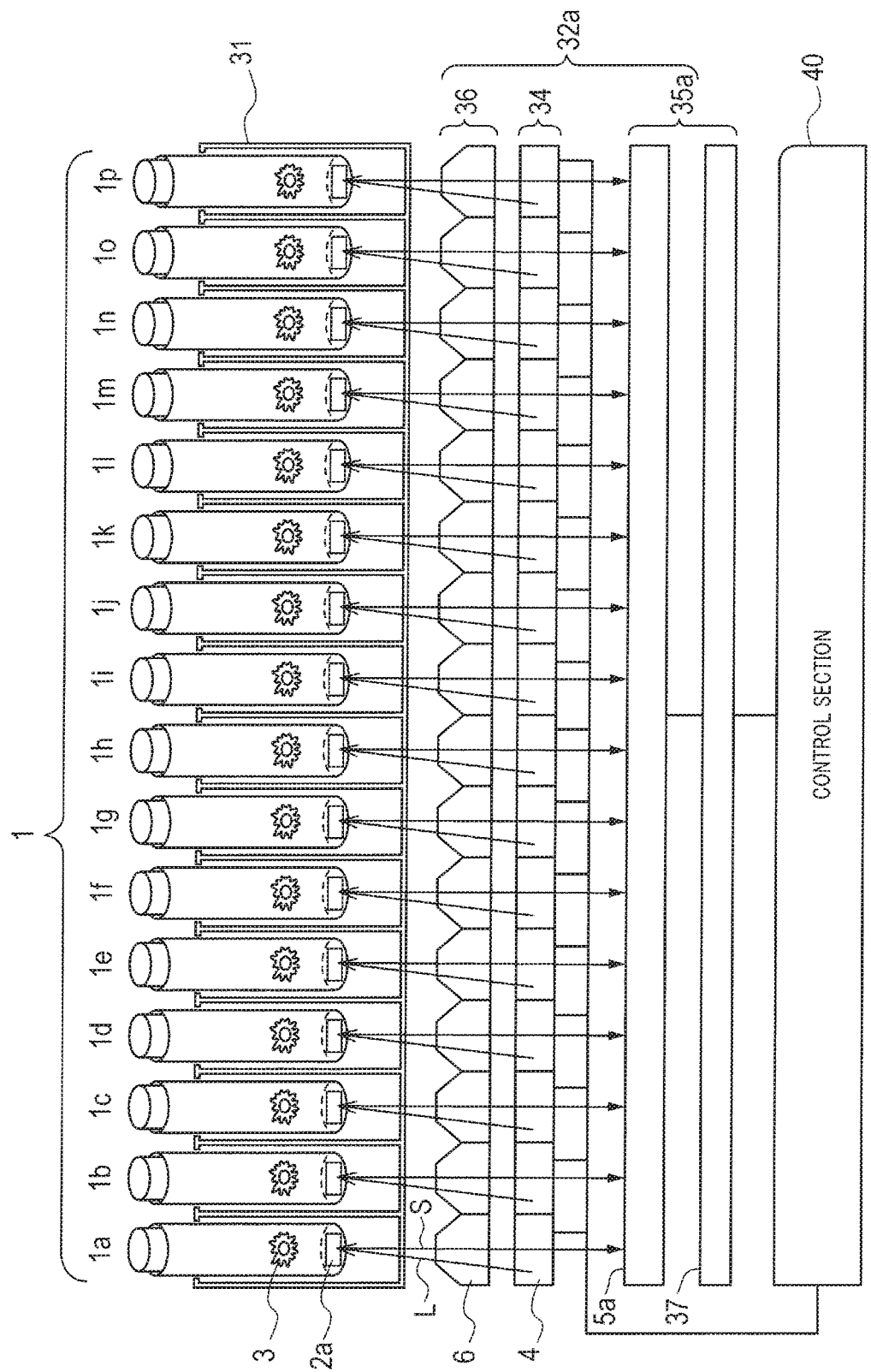
FIG. 15 is a cross-sectional view illustrating an example of the container storage section and the reading section of the container management apparatus according to Embodiment 3 of the present invention.

Next, a configuration of container management apparatus 100*a* of the present embodiment will be described using FIG. 14 and FIG. 15. FIG. 14A is a perspective view illustrating an example of appearance of container management apparatus 100*a* of the present embodiment. FIG. 14B is a perspective view illustrating an example of a configuration of reading section 32*a* shown in FIG. 14A. FIG. 15 is a cross-sectional view illustrating an example of a configuration of container storage section 31 and reading section 32*a* shown in FIG. 14A.

As shown in FIG. 14A, container management apparatus 100*a* of the present embodiment is provided with container storage section (also referred to as a "rack") 31 that can store a plurality of tubular sample containers 1 while separating the plurality of tubular sample containers 1 from each other one by one, and reading section 32*a* provided below container storage section 31 to read RF tag 2*a* attached to tubular sample container 1. Container storage section 31 is detachably attached to reading section 32*a*.

As shown in FIG. 14B, reading section 32*a* is provided with LED array 34, antenna section 35*a* and optical element array 36. Optical element array 36 is disposed above LED array 34 and antenna section 35*a* is disposed below LED array 34.

As shown in FIG. 14B, LED array 34 is provided with an array of LEDs 4 shown in FIG. 13 in a matrix form. Optical element array 36 is provided with optical elements 6 shown in FIG. 13 in a matrix form.

Antenna section 35*a* shown in FIG. 14B includes antenna 5*a* shown in FIG. 13 and control circuit 37, as shown in FIG. 15.

When antenna 5*a* receives signal S, control circuit 37 outputs received signal S to control section 40.

Furthermore, as shown in FIG. 15, respective storage sections of container storage section 31 store tubular sample containers 1*a* to 1*p*. The storage section is a space for storing tubular sample container 1. Tubular sample container 1 is inserted into or extracted from this space.

Furthermore, as shown in FIG. 15, a plurality of LEDs 4 constituting LED array 34 are respectively arranged in one-to-one correspondence with the storage sections of tubular sample containers 1*a* to 1*p*. That is, respective LEDs 4 arranged in a matrix form as shown in FIG. 14B have a one-to-one correspondence with RF tags 2*a* of tubular sample containers 1 stored in the respective storage sections.

Furthermore, as shown in FIG. 15, the plurality of optical elements 6 constituting optical element array 36 are respectively arranged in one-to-one correspondence with the storage sections of tubular sample containers 1*a* to 1*p*. That is, respective optical elements 6 arranged in a matrix form as shown in FIG. 14B have a one-to-one correspondence with RF tags 2*a* of tubular sample containers 1 stored in the respective storage sections.

As shown in FIG. 15, antenna 5*a* is arranged so as to receive signal S from respective RF tags 2*a* attached to the bottom surfaces of tubular sample containers 1*a* to 1*p*.

Thus, in reading section 32*a*, a plurality of reading sections, each reading section being made up of one LED 4 and one optical element 6 as one set, and each reading section is arranged in one-to-one correspondence with the storage section of one tubular sample container 1.

As described using FIG. 13, irradiation light L from each LED 4 is radiated onto each RF tag 2a of tubular sample container 1 via each optical element 6 and each signal S is received by antenna 5a. Signal S is outputted from control circuit 37 to control section 40. That is, when each tubular sample container 1 is stored in container storage section 31, RF tag 2a attached to each tubular sample container 1 is read.

Note that in FIG. 15, each storage section of container storage section 31 is partitioned from each other by a wall of container storage section 31, and so even when irradiation light L is spread by optical element 6, each beam of irradiation light L never affects each other.

For example, irradiation light L radiated onto RF tag 2a of tubular sample container 1b is never radiated onto RF tag 2a of tubular sample container 1a or RF tag 2a of tubular sample container 1c.

As shown in FIG. 15, container management apparatus 100a is provided with control section 40. Control section 40 can control turning on/off of irradiation light L and increase/decrease of irradiation power of irradiation light L for each of LEDs 4 constituting LED array 34. As described above, control section 40 receives signal S received by antenna 5a from control circuit 37.

Figure 16:
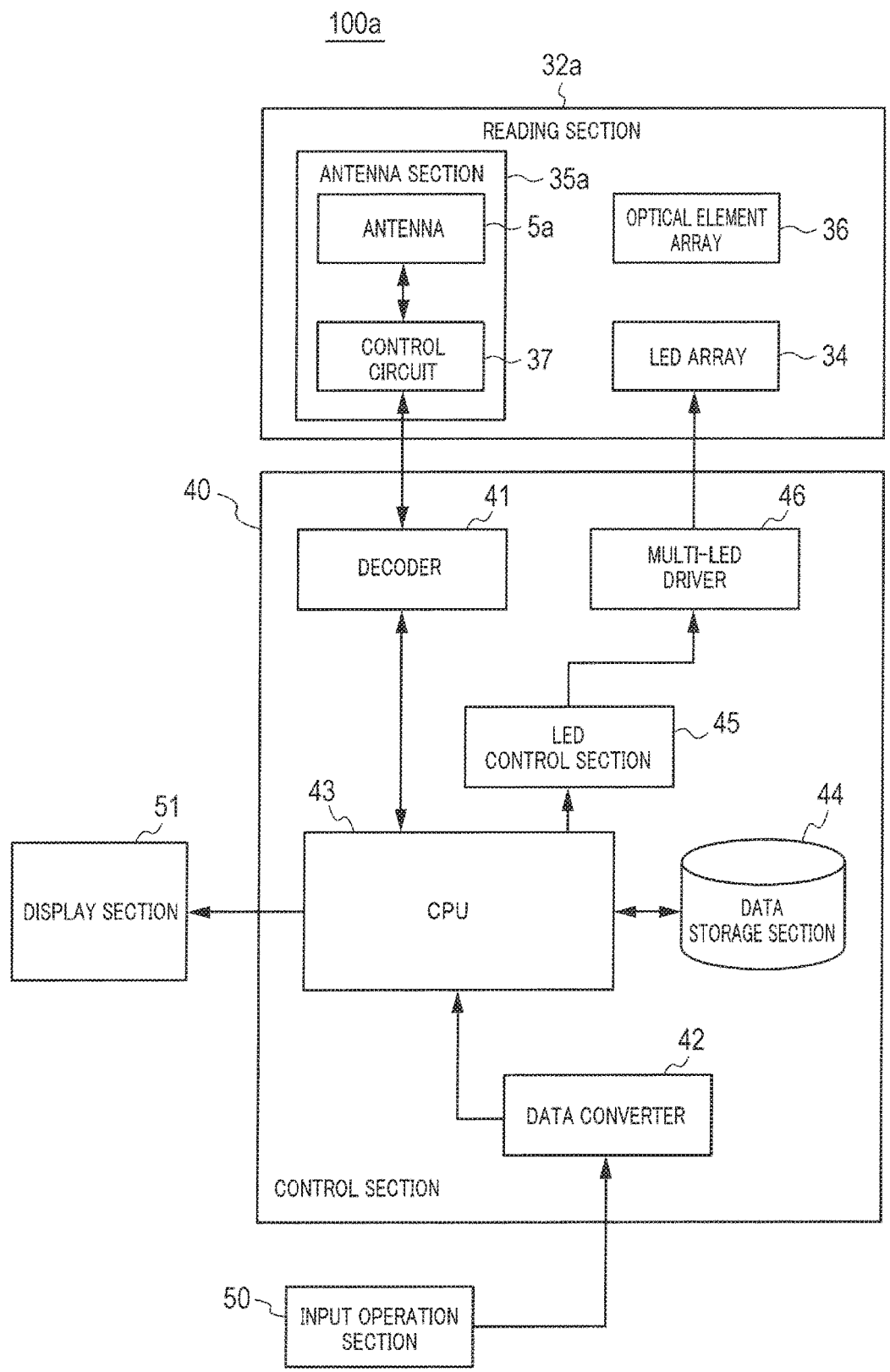
FIG. 16 is a block diagram illustrating an example of a configuration of the container management apparatus according to Embodiment 3 of the present invention.

Next, a configuration of container management apparatus 100a will be described using FIG. 16. FIG. 16 is a block diagram illustrating an example of a configuration of container management apparatus 100a. Note that in FIG. 16, illustration of container storage section 31 is omitted.

As shown in FIG. 16, container management apparatus 100a includes reading section 32a, control section 40, input operation section 50 and display section 51.

Since reading section 32a has been described using FIG. 14A, FIG. 14B, and FIG. 15, description thereof is omitted here.

Input operation section 50 is an input apparatus such as a touch panel, keyboard or mouse. Input operation section 50 receives an instruction operation, selection operation or the like from the user and outputs information (details will be described later) illustrating contents of the received operation to control section 40.

Display section 51 is a display apparatus such as a display. Display section 51 displays information (details will be described later) under the control of control section 40.

Note that container management apparatus 100a may be provided with at least one of input operation section 50 and display section 51 or need not be provided with either input operation section 50 or display section 51.

Control section 40 is provided with decoder (modulator/demodulator) 41, data converter 42, CPU (central processing unit) 43, data storage section 44, LED control section 45 and multi-LED driver 46. Control section 40 is connected to reading section 32a, input operation section 50 and display section 51.

Decoder 41 receives a signal (signal S) including container identification information from control circuit 37 constituting antenna section 35a and decodes the inputted signal. Decoder 41 outputs the container identification information obtained through decoding to CPU 43.

The container identification information outputted to CPU 43 is used for a container position registration process which will be described later (see FIG. 17) and a container position determination process which will be described later (see FIG. 18).

Data converter 42 receives information (hereinafter referred to as "input information") received by input operation section 50, converts the input information to a predetermined data format and outputs the input information to CPU 43. The input information is, for example, specimen information.

The specimen information is information relating to specimen 3 stored in tubular sample container 1 (e.g., information indicating a date on which specimen 3 is stored, contents or the like of specimen 3). The specimen information is used for a container position registration process which will be described later.

CPU 43 controls data storage section 44, LED control section 45, display section 51 or the like. Note that CPU 43 may also control entire container management apparatus 100a.

For example, when tubular sample container 1 is stored in container storage section 31 for the first time, CPU 43 performs a container position registration process that registers the position of container storage section 31 in which tubular sample container 1 is stored. Details of the container position registration process will be described later using FIG. 17.

For example, when tubular sample container 1 is extracted from container storage section 31 and then stored in container storage section 31 again, CPU 43 performs a container position determination process that determines whether or not tubular sample container 1 is stored at a registered position of container storage section 31 (hereinafter referred to as "registered position"). Details of the container position determination process will be described later using FIG. 18.

Data storage section 44 is a storage device such as a memory or hard disk drive.

For example, data storage section 44 stores storage position information. The storage position information is information indicating the position of a storage section of tubular sample container 1 in container storage section 31 (hereinafter also referred to as "storage position"). As described above, since each storage position has a one-to-one correspondence with each LED 4, the storage position information can also be said to be information indicating the position of each LED 4. The storage position information is read by CPU 43 and used for a container position registration process and a container position determination process which will be described later.

For example, data storage section 44 stores position registration information generated when CPU 43 performs a container position registration process. The position registration information is information that associates, for example, container identification information, storage position information with specimen information.

The example in FIG. 16 shows a configuration in which control section 40 is provided with data storage section 44, but data storage section 44 may be provided outside control section 40. In that case, data storage section 44 may be provided inside container management apparatus 100a or outside container management apparatus 100a.

When the power of container management apparatus 100a or control section 40 is turned on, LED control section 45 controls multi-LED driver 46 so as to sequentially turn on respective LEDs 4 of LED array 34 based on an instruction from CPU 43. The order in which respective LEDs 4 are turned on and a time period during which respective LEDs 4 are on are predetermined. Sequential turning on of respective LEDs 4 is done repeatedly.

When the power of container management apparatus 100a or control section 40 is turned off, LED control section 45 controls multi-LED driver 46 so as to turn off each LED 4 of LED array 34 based on an instruction from CPU 43.

LED control section 45 controls multi-LED driver 46 so as to increase or decrease the irradiation power of irradiation light L radiated from each LED 4 based on an instruction from CPU 43. For example, upon receiving an instruction for increasing the irradiation power of irradiation light L from CPU 43, LED control section 45 controls multi-LED driver 46 so as to increase the irradiation power by a predetermined value for a certain time period. On the other hand, upon receiving an instruction for decreasing the irradiation power of irradiation light L from CPU 43, LED control section 45 controls multi-LED driver 46 so as to decrease the irradiation power by a predetermined value.

Multi-LED driver 46 turns on or off each LED 4 or increases or decreases the irradiation power of each LED 4 based on the control of LED control section 45.

Figure 17:
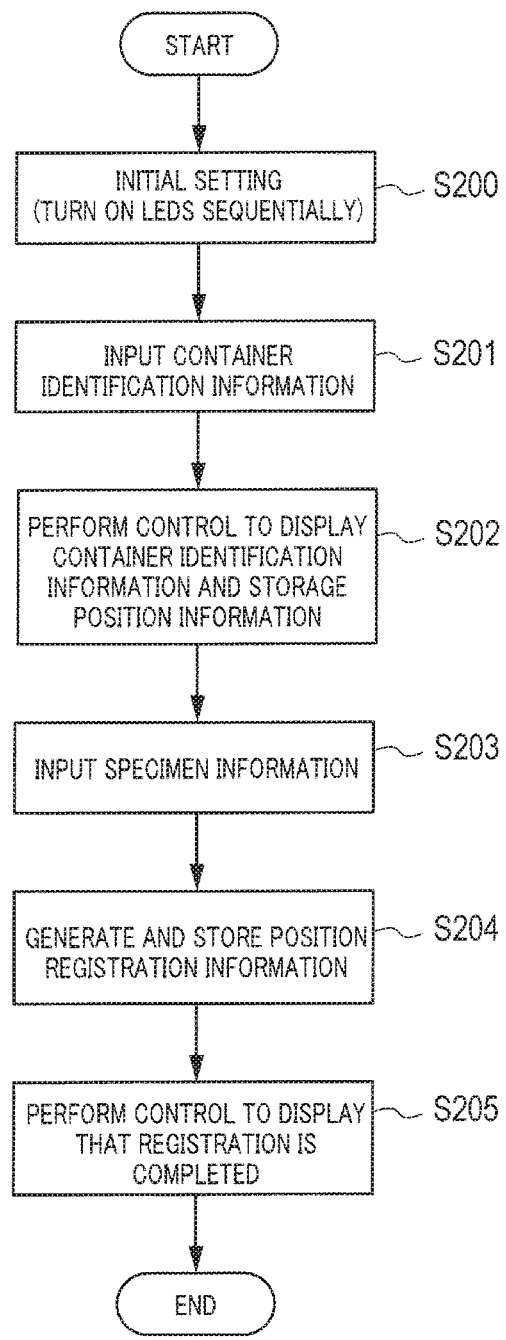
FIG. 17 is a diagram illustrating an example of a container position registration process flow of the container management apparatus according to Embodiment 3 of the present invention.

Next, operation of container management apparatus 100a will be described using FIG. 17 and FIG. 18. FIG. 17 is a diagram illustrating an example of a container position registration process flow according to the present embodiment. FIG. 18 is a diagram illustrating an example of a container position determination process flow according to the present embodiment.

First, the container position registration process flow shown in FIG. 17 will be described. This process is performed when, for example, the user stores tubular sample container 1 containing specimen 3 in a predetermined storage section of container storage section 31 for the first time.

First, the user stores tubular sample container 1 containing specimen 3 in a desired storage section of container storage section 31. The user turns on the power of container management apparatus 100a and performs an instruction operation on an initial setting through input operation section 50. Upon receiving this instruction operation, input operation section 50 outputs information indicating the initial setting to CPU 43 via data converter 42.

Upon receiving the information indicating the initial setting instruction, CPU 43 performs an initial setting (step S200). For example, CPU 43 instructs LED control section 45 so as to sequentially turn on respective LEDs 4 of LED array 34.

LED control section 45 controls multi-LED driver 46 based on the instruction from CPU 43. By sequentially turning on respective LEDs 4, multi-LED driver 46 causes respective LEDs 4 to sequentially radiate irradiation light L with predetermined irradiation power. At this time, CPU 43 instructs sequential turning on of LEDs 4 based on predetermined order of turning on LEDs 4. Therefore, CPU 43 keeps track of which LED 4 is turned on in real time.

When RF tag 2a on the bottom surface of tubular sample container 1 stored by the user is irradiated with irradiation light L, irradiation light L is received by optical sensor 20 of RF tag 2a shown in FIG. 12. The following process is performed at RF tag 2a.

When optical sensor 20 receives irradiation light L, power generation section 22 generates power. The power generated is supplied from power generation section 22 to memory 23 and control circuit 24. Memory 23 and control circuit 24 are activated in this way. Control circuit 24 reads container identification information from memory 23 and causes antenna 21 to transmit signal S including the container identification information.

The processing of RF tag 2a has been described so far. Hereinafter, processing of container management apparatus 100a will be described again.

When antenna 5a receives signal S from antenna 21, control circuit 37 outputs, signal S to decoder 41. Decoder 41 decodes signal S and outputs the container identification information obtained through decoding to CPU 43.

CPU 43 receives the container identification information from decoder 41 (step S201). CPU 43 reads storage position information indicating a storage position corresponding to LED 4 which has been turned on (position of the storage section at which the user stores tubular sample container 1) from data storage section 44.

Next, CPU 43 controls display section 51 so as to display the inputted container identification information and the read storage position information (step S202). Under this control, display section 51 displays the container identification information and the storage position information. This allows the user to recognize the container identification information and the storage position information about stored tubular sample container 1.

When the user performs an operation to input specimen information through input operation section 50, input operation section 50 outputs the specimen information to CPU 43 via data converter 42.

Upon receiving the specimen information (step S203), CPU 43 generates position registration information which associates the container identification information and the storage position information with the specimen information and causes data storage section 44 to store the position registration information (step S204).

Note that CPU 43 may also control display section 51 so as to display the inputted specimen information. The specimen information is thus displayed on display section 51, and so the user can confirm the specimen information. Furthermore, CPU 43 may also control display section 51 so as to display the association between the container identification information, the storage position information and the specimen information. The association between those pieces of information is thus displayed on display section 51, and the user can thereby confirm the association.

CPU 43 controls display section 51 so as to display that registration of the storage position is completed (step S205). Under this control, a message or the like indicating that registration of the storage position is completed is displayed on display section 51. The user can thereby recognize that registration of the storage position is completed.

After that, the user turns off the power of container management apparatus 100a. Each LED 4 is thus turned off. The user then removes container storage section 31 storing tubular sample container 1 from reading section 32a and stores container storage section 31, for example, in a freezer or incubator. Tubular sample container 1 is kept stored in container storage section 31.

The container position registration process flow shown in FIG. 17 has been described so far.

Next, a container position determination process flow shown in FIG. 18 will be described. This process is performed, for example, after the container position registration process in FIG. 17 is performed, when the user extracts tubular sample container 1 from container storage section 31 for observation and stores tubular sample container 1 after observation in container storage section 31 again.

First, the user extracts container storage section 31 from the freezer or incubator and attaches container storage section 31 to reading section 32a. The user then turns on the power of container management apparatus 100a.

When the power is turned on, CPU 43 causes LEDs 4 to sequentially turn on as in the case of the container position registration process in FIG. 17 (step S300).

Suppose the user has extracted tubular sample container 1 from container storage section 31 here. In this case, irradiation light L from LED 4 corresponding to the storage section of extracted tubular sample container 1 is no longer received by optical sensor 20 of RF tag 2a attached to tubular sample container 1. Power generation in power generation section 22 is thereby stopped and the power supply from power generation section 22 to memory 23 and control circuit 24 is stopped. This causes memory 23 and control circuit 24 to become inactive and transmission of signal S including container identification information from antenna 21 is stopped. This prevents the container identification information from being inputted to CPU 43.

When predetermined LED 4 is turned on, if no container identification information is inputted from decoder 41, CPU 43 reads all the position registration information from data storage section 44. CPU 43 adds extraction information to the position registration information, out of the read position registration information, including the storage position information indicating the storage position corresponding to LED 4 which is turned on and updates the position registration information (step S301). The extraction information refers to information indicating that tubular sample container 1 has been extracted.

Note that after step S301, CPU 43 may also control display section 51 so as to display the position registration information to which the extraction information is added (container identification information, storage position information, specimen information). This control causes display section 51 to display the container identification information, the storage position information and the specimen information. Thus, the user can confirm the container identification information, the storage position information and the specimen information about extracted tubular sample container 1.

After the addition of extraction information, LEDs 4 are sequentially turned on. CPU 43 determines whether or not the container identification information included in the position registration information to which the extraction information is added is inputted from decoder 41 (step S302).

When the user finishes observation of extracted tubular sample container 1, stores tubular sample container 1 in container storage section 31 again and irradiation light L is received by optical sensor 20 of RF tag 2a, RF tag 2a becomes active and antenna 5a receives signal S including container identification information. Therefore, in this case, CPU 43 receives the container identification information from decoder 41. That is, CPU 43 can read the container identification information.

On the other hand, when the user has not stored extracted tubular sample container 1 in container storage section 31 again or the user has stored extracted tubular sample container 1 in container storage section 31 again but if a water content (e.g., fog or water vapor) is adhered to optical sensor 20 of RF tag 2a, irradiation light L is hardly received by optical sensor 20 of RF tag 2a. Thus, RF tag 2a remains inactive and antenna 5a cannot receive signal S including the container identification information. In such cases, CPU 43 cannot receive the container identification information from decoder 41. That is, CPU 43 cannot read the container identification information.

When the result of the determination process in step S302 shows that the container identification information has been received (step S302: YES), CPU 43 performs a determination process in step S306. The determination process in step S306 will be described later.

When the result of the determination process in step S302 shows that the container identification information has not been received (step S302: NO), CPU 43 determines whether or not the number of times of reading has exceeded the defined number of times of reading (e.g., 3 times) (step S303).

When the result of the determination process in step S303 shows that the number of times of reading has exceeded the defined number of times of reading (step S303: YES), CPU 43 performs a process in step S305. The process in step S305 will be described later.

When the result of the determination process in step S303 shows that the number of times of reading has not exceeded the defined number of times of reading (step S303: NO), CPU 43 instructs LED control section 45 so as to increase irradiation power of irradiation light L of LED 4 (LED 4 corresponding to the storage position indicated by the storage position information included in the position registration information to which the extraction information is added) (step S304).

Upon receiving this instruction, LED control section 45 controls multi-LED driver 46 so as to increase the irradiation power by a predetermined value for a certain time period. This causes the irradiation power of the irradiation light from LED 4 to increase. Note that the increment of the irradiation power is set within a range in which specimen 3 is not affected.

By increasing the irradiation light in this way, it is possible to evaporate the water content (e.g., fog, water vapor) adhered to optical sensor 20 of RF tag 2a of tubular sample container 1, allowing optical sensor 20 to receive irradiation light L.

For example, when container storage section 31 is extracted from the freezer or the like for observation, the water content may be adhered to tubular sample container 1 stored in container storage section 31, but according to the aforementioned control that increases the irradiation power, optical sensor 20 is enabled to receive irradiation light L by removing the water content, thus providing a large effect.

After step S304, the determination processes in steps S302 and S303 are executed again. That is, the processes in steps S302 to S304 are repeated until the container identification information is read or until a defined number of times of reading is reached.

Note that it may be assumed that water content cannot be completely removed by increasing the irradiation power only once and reading fails again. Therefore, by setting the defined number of times of reading to a plurality of times, it is preferable to make sure that the process in step S303 is performed over a plurality of times. However, the number of times of reading is assumed to be set within a range in which specimen 3 is not affected.

When the result of the determination process in step S303 shows that the defined number of times of reading is reached (step S303: YES), CPU 43 controls display section 51 so as to display that reading of the container identification information fails (step S305).

This control causes display section 51 to display, for example, a message indicating that reading of the container identification information has failed. This allows the user to recognize that reading of the container identification information has failed. In this case, the user checks, for example, a surface state of tubular sample container 1 and takes action such as manually wiping off fogging on the bottom surface of tubular sample container 1 (e.g., optical sensor 20 of RF tag 2a).

When the result of the determination process in step S302 shows that the container identification information is received, that is, when the container identification information has been successfully read (step S302: YES), CPU 43 reads position registration information to which extraction information corresponding to the received container identification information is added from data storage section 44.

Note that the irradiation power is increased in step S304, CPU 43 instructs LED control section 45 so as to decrease the irradiation power of irradiation light L of LED 4 (so as to restore the original irradiation power).

CPU 43 then determines whether or not the storage position corresponding to LED 4 which is turned on matches the storage position indicated by the storage position information included in the position registration information (step S306).

When the result of the determination process in step S306 shows that the two storage positions do not match (step S306: NO), CPU 43 determines that tubular sample container 1 is not stored at the registered position.

CPU 43 controls display section 51 so as to display that the storage position of tubular sample container 1 is wrong (tubular sample container 1 is not stored at the registered position (step S307).

This control causes display section 51 to display a message or the like indicating that the storage position of tubular sample container 1 is wrong. This allows the user to recognize that tubular sample container 1 is stored at a wrong position.

Note that in step S307, CPU 43 may control display section 51 so as to display the storage position information included in the position registration information. In step S307, CPU 43 may also control display section 51 so as to cause LED 4 corresponding to the storage position indicated by the storage position information included in the position registration information to blink. Such control allows the user to recognize a correct position (registered position) at which tubular sample container 1 should be stored.

When the result of the determination process in step S306 shows that the two storage positions match (step S306: YES), CPU 43 determines that tubular sample container 1 is stored at the registered position.

CPU 43 controls display section 51 so as to display that the storage position of tubular sample container 1 is correct (tubular sample container 1 is stored at the registered position) (step S308).

This control causes display section 51 to display a message or the like indicating that the storage position of tubular sample container 1 is correct. This allows the user to recognize that tubular sample container 1 is stored at a correct position (registered position).

After that, CPU 43 deletes the extraction information from the read position registration information and updates the position registration information.

Figure 18:
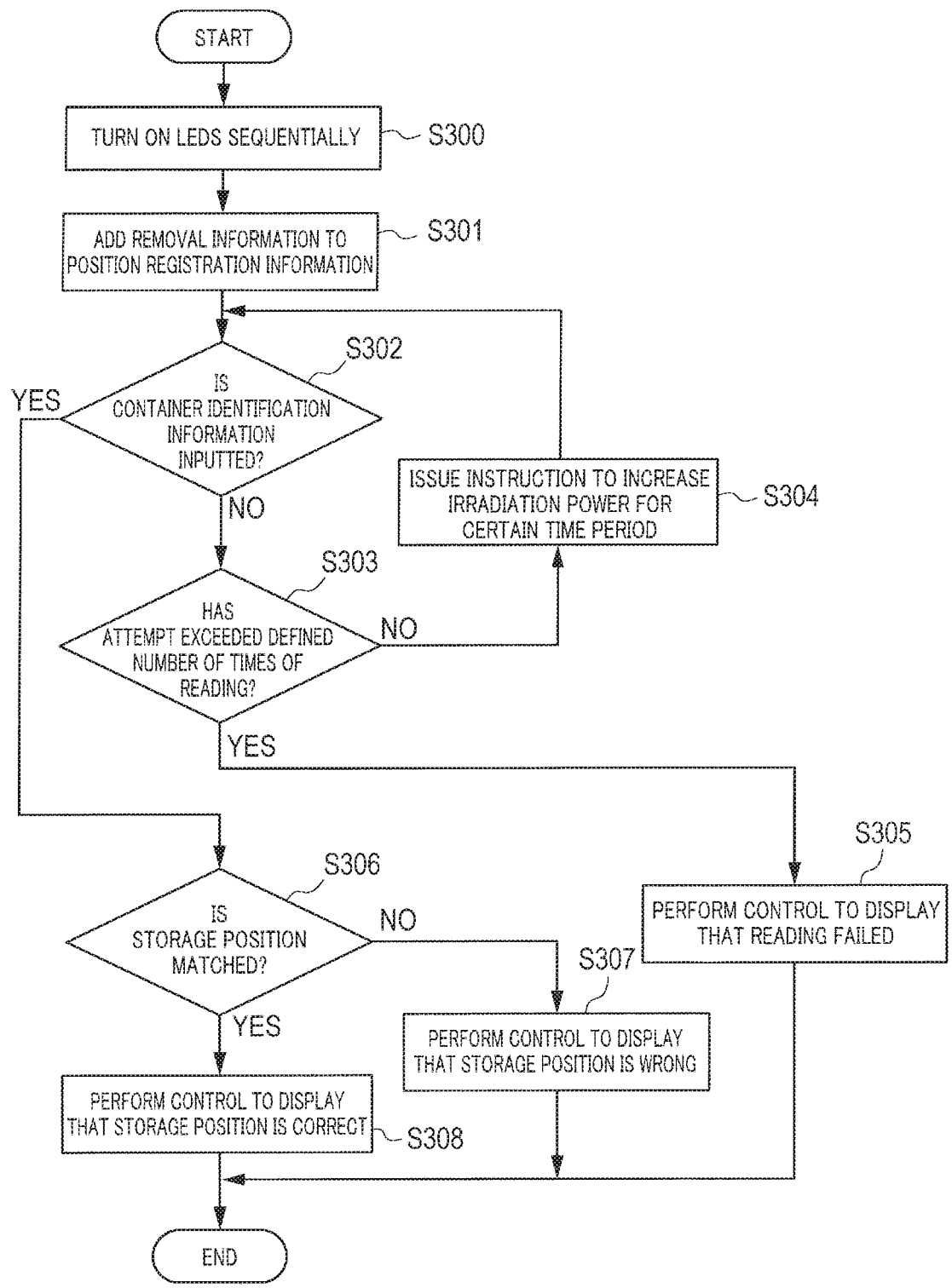
FIG. 18 is a diagram illustrating an example of a container position determination process flow of the container management apparatus according to Embodiment 3 of the present invention.

The container position determination process flow shown in FIG. 18 has been described so far.

As described above, container management apparatus 100a of the present embodiment determines whether or not the storage position information when tubular sample container 1 is stored at a predetermined storage position matches the storage position information when tubular sample container 1 is extracted from the predetermined storage position and then stored again, controls display section 51, when the two pieces of storage position information match, so as to display that the storage position at which tubular sample container 1 is stored again is correct and controls display section 51, when the two pieces of storage position information do not match, so as to display that the storage position at which tubular sample container 1 is stored again is wrong. This allows the user to appropriately manage tubular sample container 1 in container storage section 31.

Container management apparatus 100a of the present embodiment forms a plurality of reading sections, each reading section having one LED 4 and one optical element 6 as one set, and each reading section being disposed in one-to-one correspondence with one tubular sample container 1. It is thereby possible to accurately and efficiently read container identification information of RF tag 2a attached to tubular sample container 1.

Container management apparatus 100a of the present embodiment registers container identification information of tubular sample container 1 read by the reading sections, each having one LED 4 and one optical element 6 as one set in association with storage position information indicating the position at which tubular sample container 1 is stored. It is thereby possible to reduce human errors (meaning that tubular sample container 1 is stored at a position different from the registered position) when storing tubular sample container 1 in container storage section 31.

According to container management apparatus 100a of the present embodiment, the user needs just to store tubular sample container 1 at a desired position of container storage section 31 to read container identification information of tubular sample container 1, and the storage position information is registered in association with the container identification information. Therefore, the user need not perform any operation to instruct association between the container identification information and the storage position information.

When the container identification information of tubular sample container 1 cannot be read, container management apparatus 100a of the present embodiment increases irradiation power of LED 4 over a plurality of times so as to have no effect on specimen 3 and removes water content adhered to optical sensor 20 of RF tag 2a attached to tubular sample container 1, and it is thereby possible to save time and trouble required for the user to manually remove the water content, and speedily and accurately read container identification information without having any effect on specimen 3.

Note that the present invention is not limited to Embodiment 3, but various modifications can be made. Hereinafter, modifications of Embodiment 3 will be described.

An example has been described in Embodiment 3 where the user stores only container storage section 31 extracted from reading section 32a in a freezer or the like, but container management apparatus 100a may store container storage section 31 attached to reading section 32a and with turned on (with each LED 4 turned on) in a freezer or the like. This makes it possible to conduct a test along with a temperature change or the like in the freezer or the like.

In Embodiment 3, when the user extracts tubular sample container 1, control section 40 may control LED 4 corresponding to the position at which tubular sample container 1 is stored to blink. Alternatively, control section 40 may also control LED 4 corresponding to the position at which tubular sample container 1 is stored to increase its irradiation power. Furthermore, control section 40 may perform control so as to cause LED 4 corresponding to the position at which tubular sample container 1 is stored to increase irradiation power and blink. Such control may be performed at a time point at which tubular sample container 1 is extracted or when the storage position of the tubular sample container stored again is wrong. This allows the user to easily grasp the correct storage position when storing extracted tubular sample container 1 again.

In Embodiment 3, when the user extracts a plurality of tubular sample containers 1, control section 40 may cause each LED 4 corresponding to the position at which each tubular sample container 1 is stored to blink and change a time interval for causing each LED 4 to blink in accordance with the order in which the plurality of tubular sample containers 1 are extracted. For example, when two tubular sample containers 1 are extracted at a predetermined time interval, control section 40 may perform control so as to cause LED 4 corresponding to the position at which first extracted tubular sample container 1 is stored to blink at a first time interval and cause LED 4 corresponding to the position at which next extracted tubular sample container 1 is stored to blink at a second time interval which is longer than the first time interval. Thus, LED 4 corresponding to the position at which first extracted tubular sample container 1 is stored blinks at a shorter time interval than LED 4 corresponding to the position at which next extracted tubular sample container 1 is stored, and so the user can easily distinguish the storage positions.

An example has been described in Embodiment 3 where during a container position registration process, CPU 43 reads storage position information from data storage section 44 and generates position registration information by associating the storage position information with the container identification information received from decoder 41, but the storage position information inputted by the user may also be used.

An example has been described in Embodiment 3 where power generation section 22 of RF tag 2a generates power when optical sensor 20 receives irradiation light L, but generation of power is not limited to this. For example, power generation section 22 may also generate power using the power extracted from the radio wave received by antenna 21. Furthermore, power generation section 22 may generate power using an induced electromotive force of antenna 5a and antenna 21.

In Embodiment 3, RF tag 2a may incorporate a chargeable battery or a capacitor so that RF tag 2a is activated by receiving irradiation light from LED 4. In this case, RF tag 2a may be operated using power charged in the battery or capacitor and a gate may be provided to operate RF tag 2a with the output of optical sensor 20.

In Embodiment 3, CPU 43 may modulate irradiation light L of LED 4 so as to include at least one of position registration information, storage position information and specimen information and perform control so as to radiate irradiation light L. This specific example will be described hereinafter. Note that a case will be described hereinafter where irradiation light L is modulated so as to include the storage position information of the registered position information.

CPU 43 in container management apparatus 100a reads the storage position information included in the registered position information from data storage section 44. CPU 43 instructs LED control section 45 so as to perform modulation that includes the storage position information in irradiation light L of LED 4 corresponding to the storage position indicated by the read storage position information. After that, CPU 43 deletes the read registered position information from data storage section 44.

LED control section 45 control multi-LED driver 46 based on an instruction from CPU 43 and multi-LED driver 46 causes LED 4 to turn on. Thus, irradiation light L including the storage position information is radiated from LED 4.

Figure 19:
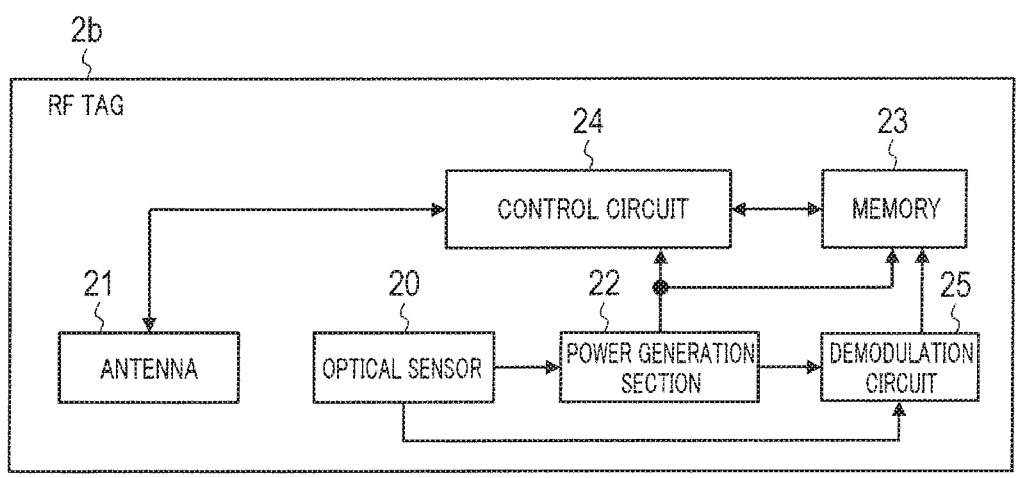
FIG. 19 is a diagram illustrating an example of a configuration of an RF tag according to a modification of Embodiment 3 of the present invention.

Irradiation light L of LED 4 is received by optical sensor 20 of RF tag 2b shown in FIG. 19. As shown in FIG. 19, RF tag 2b includes demodulation circuit 25 in addition to the components shown in FIG. 12.

In RF tag 2b, when optical sensor 20 receives irradiation light L, power generation section 22 generates power and supplies the power of memory 23, control circuit 24 and demodulation circuit 25. Demodulation circuit 25 demodulates irradiation light L received by optical sensor 20, extracts storage position information and outputs the storage position information to memory 23. Thus, the storage position information is stored in association with the container identification information stored in memory 23.

Thus, according to the present modification, through modulation and demodulation of irradiation light L, container management apparatus 100a transmits storage position information to RF tag 2b and the storage position information is stored in RF tag 2b. Thus, the registered position information stored in container management apparatus 100a can be moved to and stored in RF tag 2b.

It is thereby possible to reduce the storage capacity of data storage section 44 of container management apparatus 100a.

Furthermore, for example, when the user extracts tubular sample container 1, and then forgets the registered position, the user may read RF tag 2a (or RF tag 2b) using an RF tag reader (not shown) connected to container management apparatus 100a, causes the read registered position information to be displayed on display section 51, and can thereby confirm the registered position.

For example, when tubular sample containers 1 are stored in all the storage sections of container storage section 31, modulation is performed, which differs for every irradiation light L of LED 4 corresponding to each storage section, all LEDs 4 are caused to turn on simultaneously, and it is thereby possible to store storage position information included in registered position information in each RF tag 2a (or RF tag 2b) at a time. This can shorten the time required to store storage position information in all RF tags 2a (or RF tags 2b).

Note that instead of using modulation of irradiation light L, CPU 43 may perform control so as to transmit at least one of position registration information, storage position information and specimen information to RF tag 2 via decoder 41 and antenna section 35a. Thus, each piece of information is stored in memory 23 of RF tag 2, and it is possible to achieve effects similar to those when modulation of aforementioned irradiation light L is used.

The disclosure of Japanese Patent Application No. 2015-068363, filed on Mar. 30, 2015 and Japanese Patent Application No. 2015-161322, filed on Aug. 18, 2015, including the specifications, drawings and abstracts are incorporated herein by reference in their entirety.

INDUSTRIAL APPLICABILITY

The present invention is suitable for use in a container management apparatus and a wireless tag that manage a container containing a specimen.

REFERENCE SIGNS LIST

1 Tubular sample container
2 Two-dimensional bar code
2a, 2b RF tag

3 Specimen
4, 84 LED
5 Imaging unit
5a, 21 Antenna
6 Optical element
20 Optical sensor
22 Power generation section
23 Memory
24, 37 Control circuit
25 Demodulation circuit
31 Container storage section
32, 32a, 82 Reading section
34, 81 LED array
35 Imaging unit array
35a Antenna section
36 Optical element array
40 Control section
41 Decoder
42 Data converter
43 CPU
44 Data storage section
45 LED control section
46 Multi-LED driver
50 Input operation section
51 Display section
85 Insertion port
100, 100a, 101 Container management apparatus

The invention claimed is:

1. A container management apparatus comprising:
a container storage that stores containers while separating the containers from each other, each of the containers including a bottom surface that has a container identifier;
light emitters provided in one to one correspondence with storage positions of the containers in the container storage to irradiate bottom surfaces of the containers with irradiation light beams, respectively;
a sensor configured to acquire at least one container identifier from corresponding one of the bottom surfaces irradiated with the irradiation light beams;
a scanning control section that is configured to scan an imaging unit constituting an imaging unit array,
a decoder that is configured to receive a signal from the scanning control section, configured to decode the received signal and to output information obtained through decoding to a CPU, wherein the signal is a signal of storage position identifiers,
a control section that is configured to receive the at least one container identifier from the sensor, wherein:
the control section is configured to receive the one container identifier when one container is stored at a predetermined storage position,
is configured to generate position registration information that associates the received container identifier with one storage position identifier indicating the predetermined storage position, and store the position registration information in a data storage, and
the control section is operable to receive the one container identifier when the one container is stored in the container storage again after the one container for which the position registration information has been registered is removed from the predetermined storage position,
is configured to read the position registration information corresponding to the received container identifier from the data storage,
is configured to determine whether or not a storage position identifier indicating the storage position at which the container is stored again matches the storage position identifier included in the position registration information read from the data storage,
is operable to control a predetermined display so as to display that the storage position at which the container is stored again is correct, when two storage position identifiers match each other, and
is configured to control the display so as to display that the storage position at which the container is stored again is wrong, when the two storage position identifiers do not match each other.

2. The container management apparatus according to claim 1, further comprising a lens that is configured to spread at least one of the irradiation light beams.

3. The container management apparatus according to claim 1, wherein the control section is configured to control, when reception of the container identifier fails after radiation of the irradiation light beams, the light emitters so as to increase irradiation power of the irradiation light beams by a predetermined value for a certain time period.

4. The container management apparatus according to claim 1, wherein the control section is configured to read, when one container is removed from corresponding one storage position, the position registration information from the data storage, and controls the display to display one corresponding container identifier and storage position identifier included in the position registration information.

5. The container management apparatus according to claim 1, wherein the control section is configured to perform, when one container is removed from corresponding one storage position, at least one of: control to cause one light emitter corresponding to the corresponding one storage position to blink; and control to increase power of irradiation light of the one light emitter corresponding to the corresponding one storage position by a predetermined value.

6. The container management apparatus according to claim 5, wherein, when the containers are removed from the respective storage positions and the control section performs the control to cause the light emitters corresponding to the respective storage positions to blink, the control section is configured to control the respective light emitters such that time intervals of blinking of the respective light emitters are different from each other.

7. The container management apparatus according to claim 1, wherein, when one storage position identifier indicating corresponding one storage position at which one container is stored again does not match the one storage position identifier included in the position registration information read from the data storage, the control section is configured to perform control to cause the one light emitter corresponding to the corresponding one storage position indicated by the one storage position identifier included in the position registration information to blink.

8. The container management apparatus according to claim 1, further comprising, in addition to the light emitters, notification light emitters that are configured to turn on to make a predetermined notification to a user in one-to-one correspondence with the respective storage positions of the containers, wherein:
the control section is configured to control, when one container is removed from corresponding one storage position, one notification light emitter corresponding to the corresponding one storage position to blink.

9. The container management apparatus according to claim 8, wherein, when the containers are removed from the respective storage positions and the control section controls the notification light emitters corresponding to the respective storage positions to blink, the control section is configured to control the respective notification light emitters such that time intervals of blinking of the notification light emitters are different.

10. The container management apparatus according to claim 8, wherein, when one storage position identifier indicating corresponding one storage position at which the one container is stored again does not match the one storage position identifier included in the position registration information read from the data storage, the control section is configured to control one notification light emitter corresponding to the one storage position indicated by the one storage position identifier included in the position registration information to blink.

11. The container management apparatus according to claim 1, wherein the control section is operable to modulate the irradiation light beams of the light emitters based on information on the storage position identifiers assigned to the predetermined storage positions.

12. The container management apparatus according to claim 1, wherein:
each bottom surface has a bar code in which the container identifier is coded, and
the sensor is a sensor provided in one-to-one correspondence with a corresponding one of the storage positions of the respective containers configured to receive a reflected light beam from the bar code.

13. The container management apparatus according to claim 12, wherein:
the control section is configured to receive, when one container is stored at corresponding one storage position, corresponding one container identifier acquired by the sensor corresponding to the corresponding one storage position, and
when the one container is stored again in the container storage after the one container for which the position registration information has been registered is removed from the corresponding one storage position, the control section is configured to receive the corresponding one container identifier acquired by the sensor corresponding to the corresponding one storage position at which the container is stored again.

14. The container management apparatus according to claim 1, wherein:
each bottom surface has a wireless tag that stores therein the container identifier, and
the sensor is an antenna that is configured to receive one container identifier to be transmitted from the wireless tag activated by reception of one irradiation light beam.

15. The container management apparatus according to claim 14, wherein:
when the one container is stored at corresponding one storage position, the control section is configured to receive corresponding one container identifier transmitted from the wireless tag by reception of the irradiation light beam and received by the antenna, and
when the one container is stored again in the container storage after the one container for which the position registration information has been registered is removed from the corresponding one storage position, the control section is operable to receive the corresponding one container identifier transmitted from the wireless tag by reception of the irradiation light beam and received by the antenna.

* * * * *